United States Patent [19]

Newkirk et al.

[11] Patent Number: 4,851,375

[45] Date of Patent: Jul. 25, 1989

[54] METHODS OF MAKING COMPOSITE CERAMIC ARTICLES HAVING EMBEDDED FILLER

[75] Inventors: Marc S. Newkirk; Andrew W. Urquhart, both of Newark, Del.; Harry R. Zwicker, Elkton, Md.; H. Daniel Lesher, Wilmington, Del.

[73] Assignee: Lanxide Technology Company, LP, Newark, Del.

[21] Appl. No.: 819,397

[22] Filed: Jan. 17, 1986

Related U.S. Application Data

[63] Continuation-in-part of Ser. No. 697,876, Feb. 4, 1985, abandoned.

[51] Int. Cl.$^4$ ................ C04B 35/10; C04B 35/56; C04B 35/58
[52] U.S. Cl. .................................. 501/88; 501/96; 501/98; 501/120; 501/127; 501/128; 501/134; 264/65; 423/345; 423/411; 423/412; 423/618; 423/625
[58] Field of Search .............. 501/87, 88, 92, 94, 501/96, 98, 119, 120, 127, 128, 134; 264/65; 75/235; 423/345, 411, 412, 618, 625

[56] References Cited

U.S. PATENT DOCUMENTS

| 1,362,237 | 12/1920 | Ros | 423/618 |
|---|---|---|---|
| 2,741,822 | 4/1956 | Udy | 264/65 |
| 3,108,887 | 10/1963 | Lenie | 501/98 X |
| 3,255,027 | 6/1966 | Talsma | 264/65 |
| 3,262,763 | 7/1966 | Bechtold | 501/98 X |
| 3,296,002 | 1/1967 | Hare | 501/80 |
| 3,298,842 | 1/1967 | Suefert | 501/127 |
| 3,419,404 | 12/1968 | Mao | 501/98 X |
| 3,421,863 | 1/1969 | Bawa | 501/128 |
| 3,437,468 | 4/1969 | Suefert | 75/235 |
| 3,473,938 | 10/1969 | Oberlin | 264/65 |
| 3,473,987 | 10/1969 | Sowards | 501/119 |
| 3,514,271 | 5/1970 | Yates | 501/96 X |
| 3,551,101 | 12/1970 | Matsuo | 423/412 |
| 3,649,310 | 3/1972 | Yates | 501/92 X |
| 3,669,695 | 6/1972 | Iler | 501/96 X |
| 3,789,096 | 1/1974 | Church et al. | 264/60 |
| 3,864,154 | 2/1975 | Gazza et al. | 29/123 B |
| 3,973,977 | 8/1976 | Wilson | 501/120 |
| 4,354,991 | 10/1982 | Suzuki et al. | 501/89 X |
| 4,478,785 | 10/1984 | Huseby et al. | 501/96 X |
| 4,591,537 | 5/1986 | Aldinger et al. | 501/96 X |

FOREIGN PATENT DOCUMENTS

| 0155831 | 9/1985 | European Pat. Off. . |
| 0169067 | 1/1986 | European Pat. Off. . |
| 0116809 | 9/1986 | European Pat. Off. . |
| 1011527 | 4/1983 | U.S.S.R. ................ 423/618 |

OTHER PUBLICATIONS

"Oxidation of Molten Aluminum Alloys, Reaction with Refractories"—M. Drouzy and M. Richard–Mar. 1974–Fonderie, France No. 332, pp. 121–128.
"Refractories for Aluminum Alloy Melting Furnaces'-'-B. Clauvaud and V. Jost–Sep., 1980–Lilian Brassinga (from French) Jan., 1985.

Primary Examiner—William R. Dixon, Jr.
Assistant Examiner—Karl Group
Attorney, Agent, or Firm—Mark G. Mortenson; William E. McShane

[57] ABSTRACT

A method of making self-supporting ceramic composite structures having filler embedded therein includes infiltrating a permeable mass of filler with polycrystalline material comprising an oxidation reaction product obtained by oxidation of a parent metal such as aluminum and optionally containing therein non-oxidized constituents of the parent metal. The structure is formed by placing a parent metal adjacent to a permeable filler and heating the assembly to melt the parent metal and provide a molten body of parent metal which is contacted with a suitable vapor-phase oxidant. Within a certain temperature region and optionally aided by one or more dopants in or on the parent metal, molten parent metal will migrate through previously formed oxidation reaction product into contact with the oxidant, causing the oxidation reaction product to grow so as to embed the adjacent filler and provide the composite structure.

48 Claims, 26 Drawing Sheets

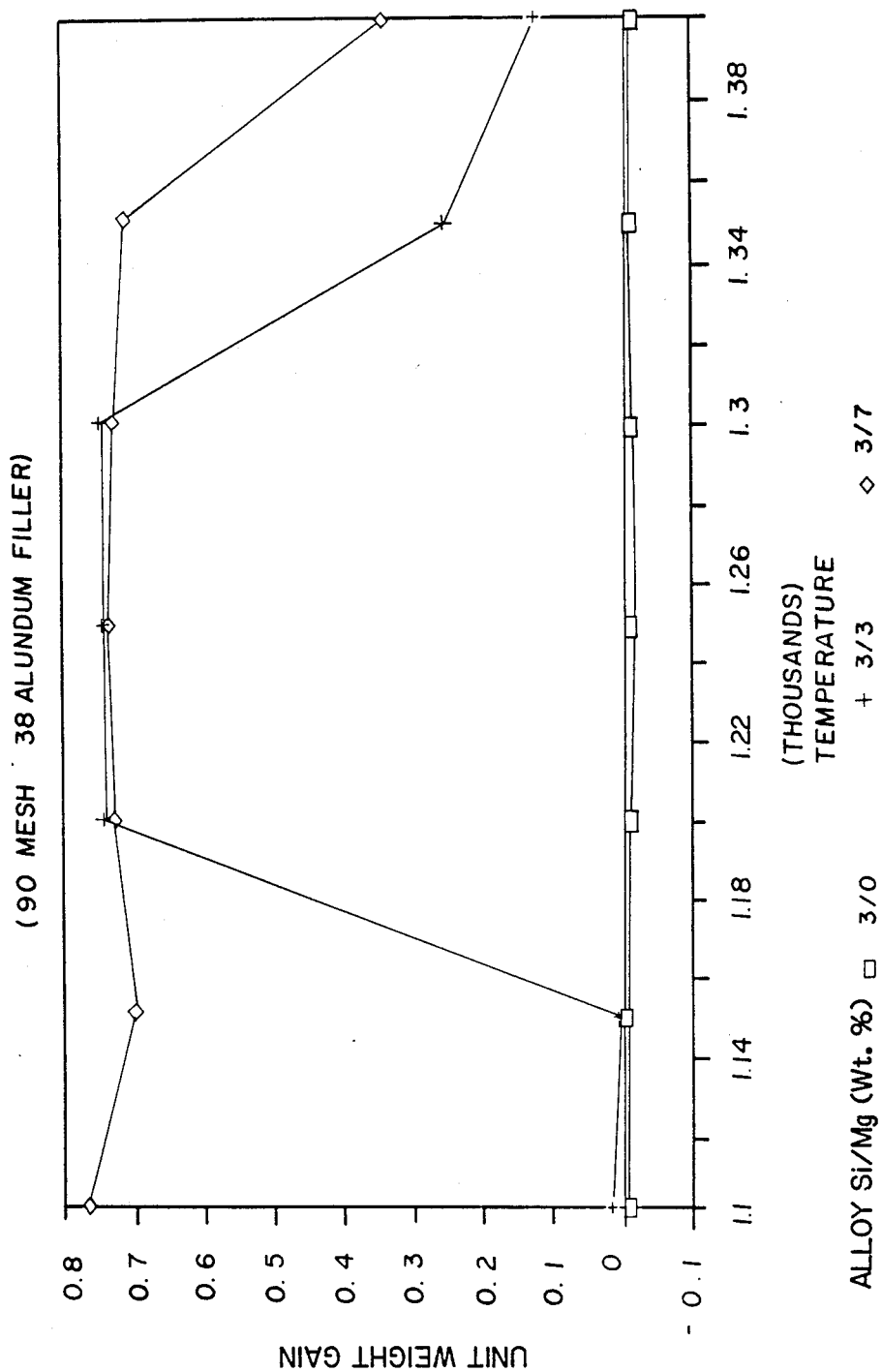

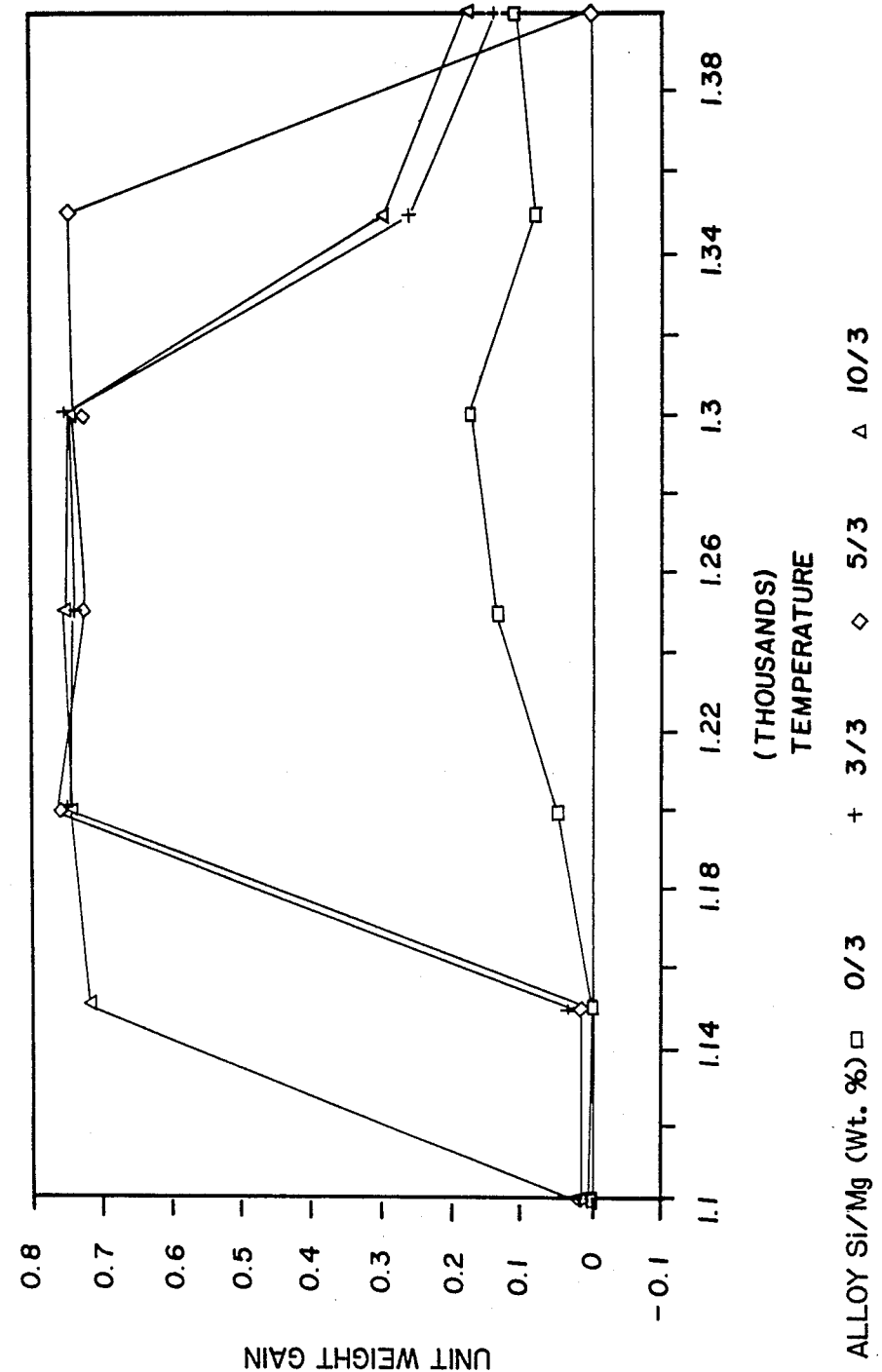

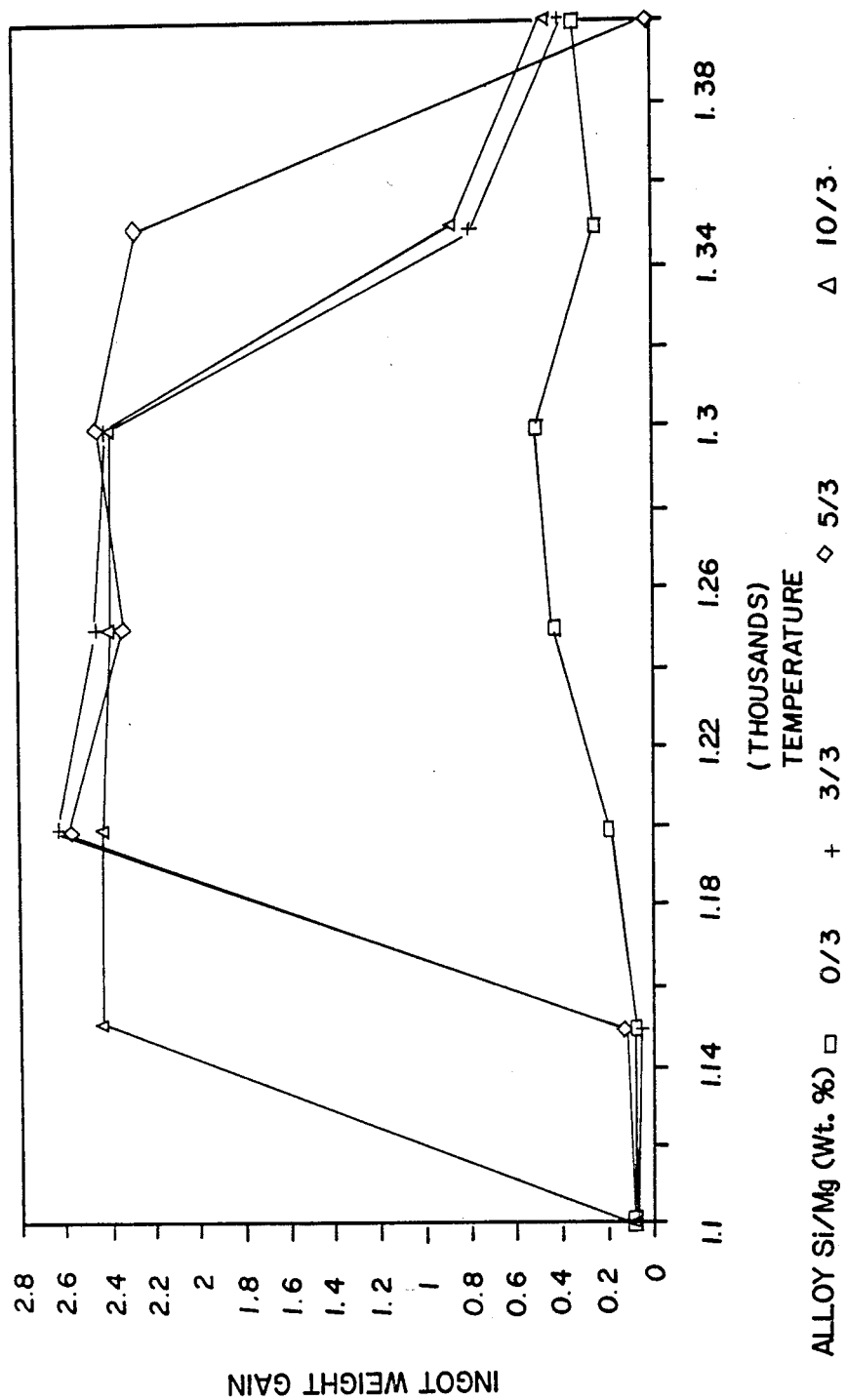

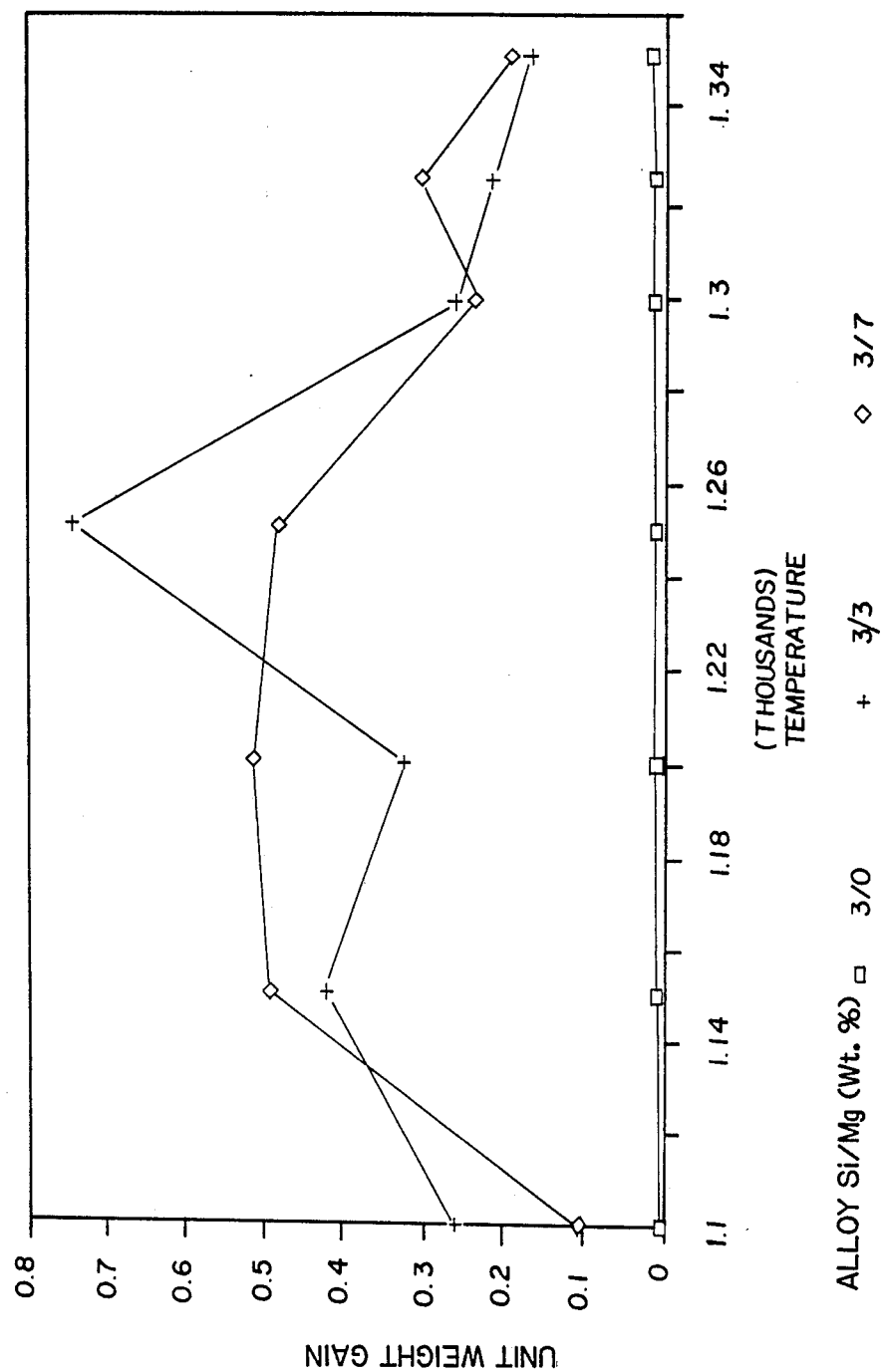

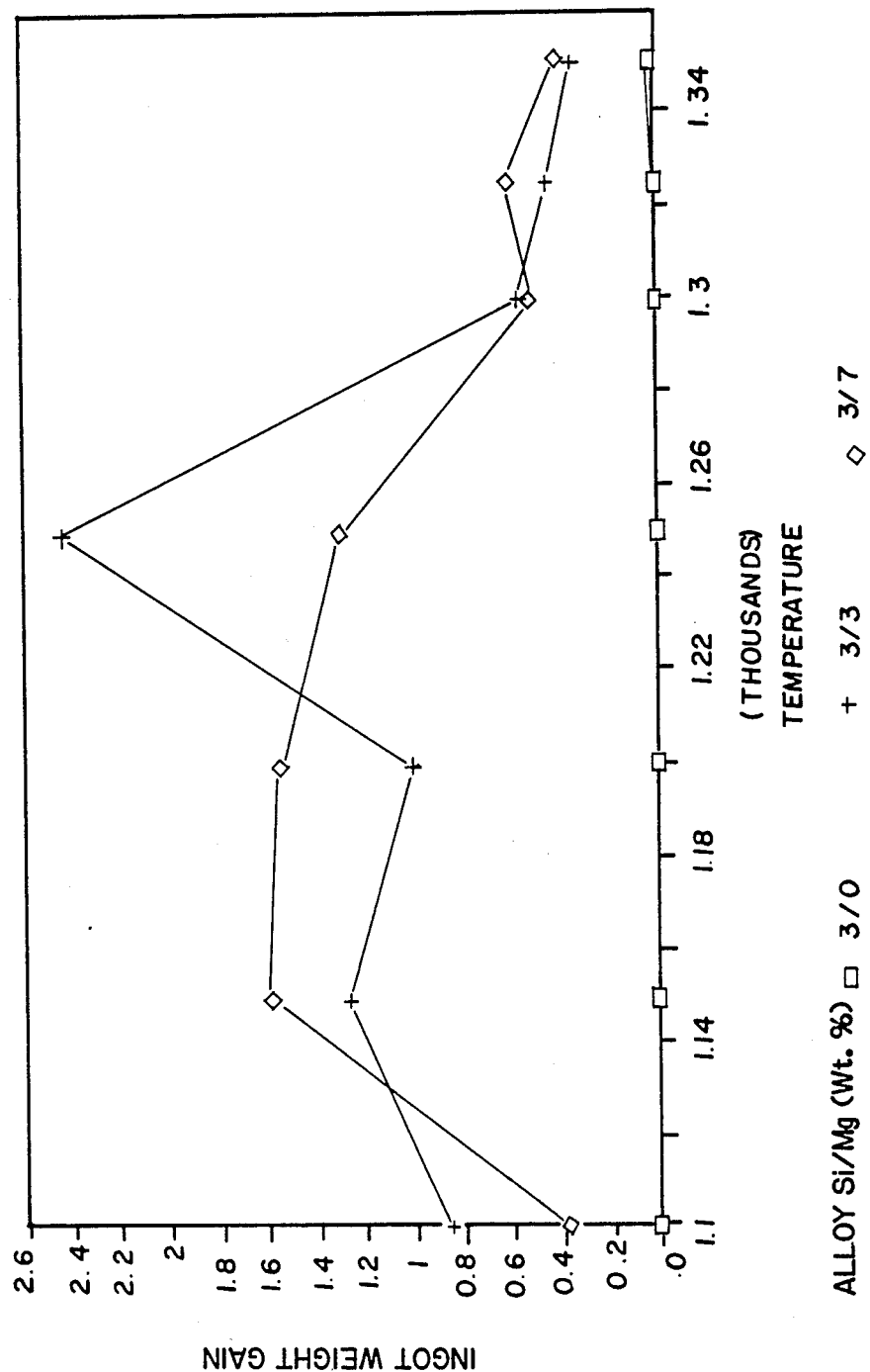

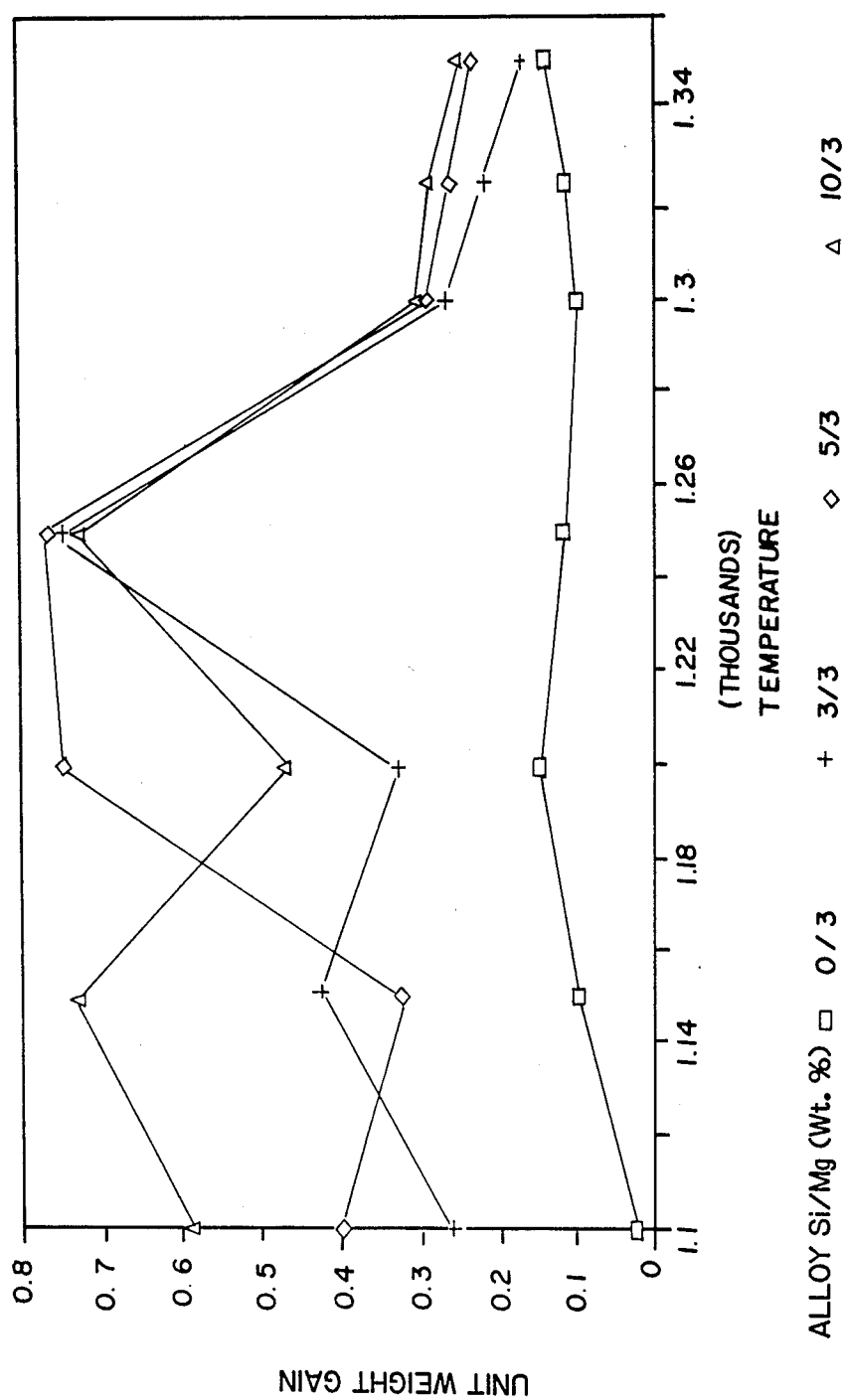

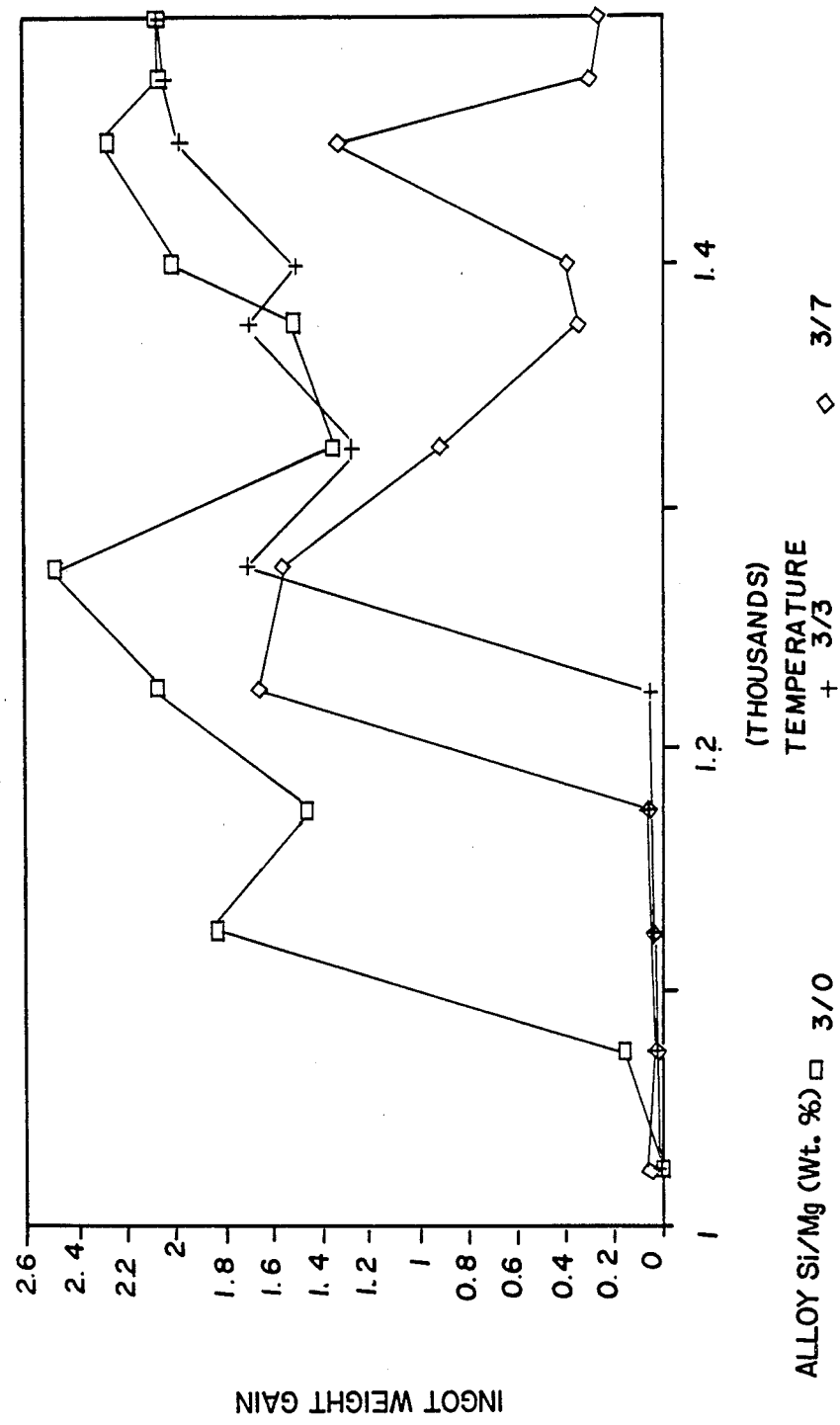

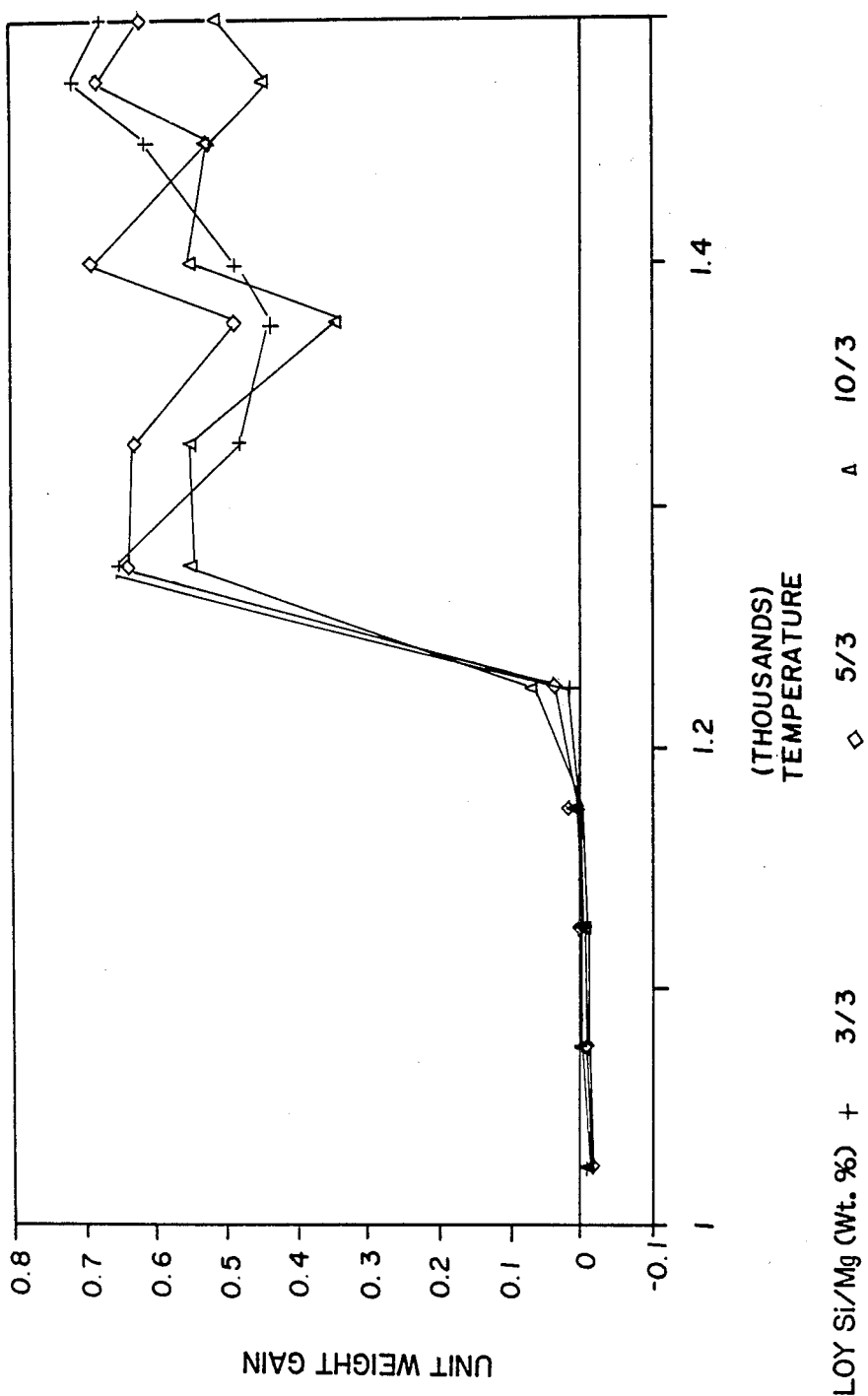

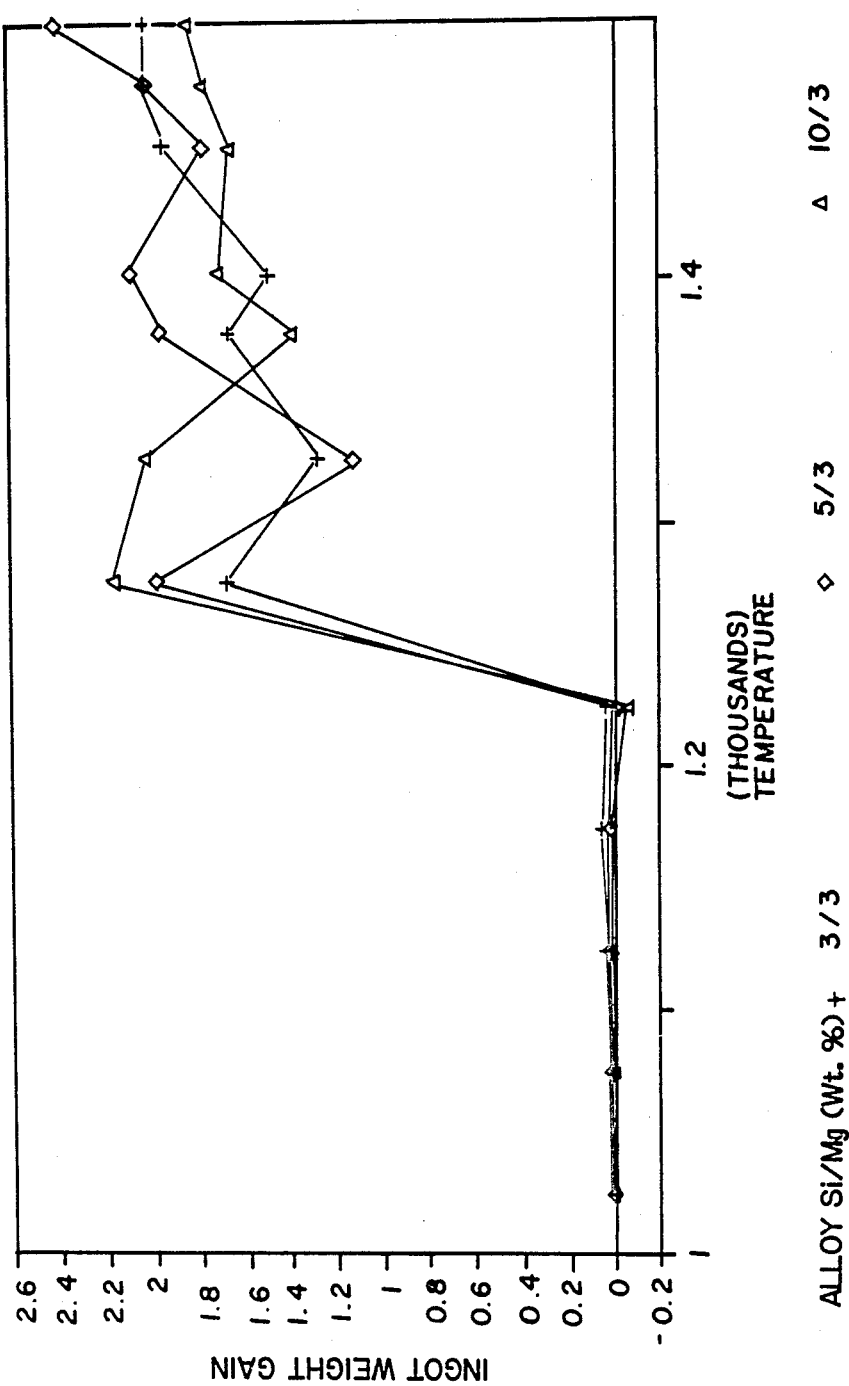

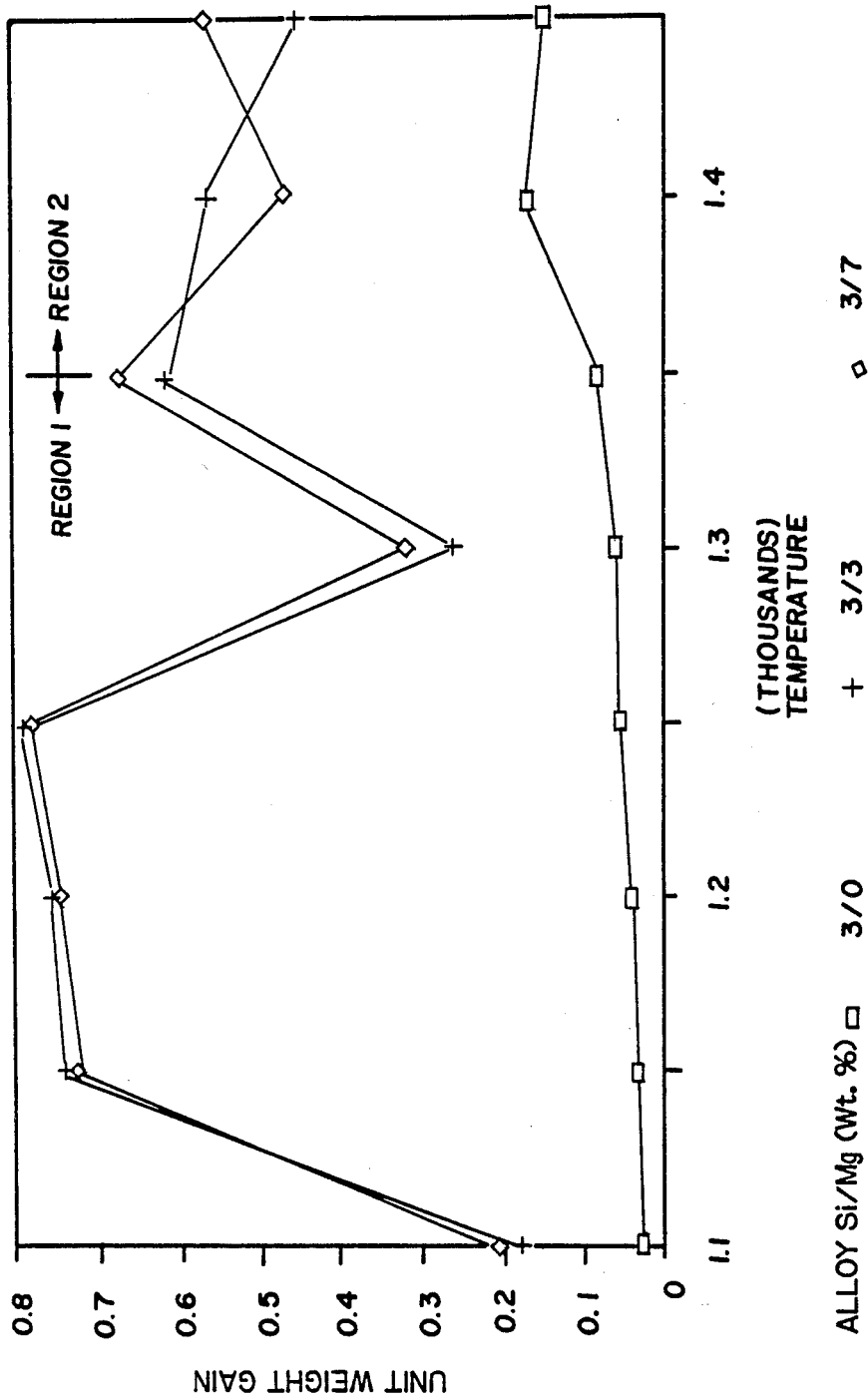

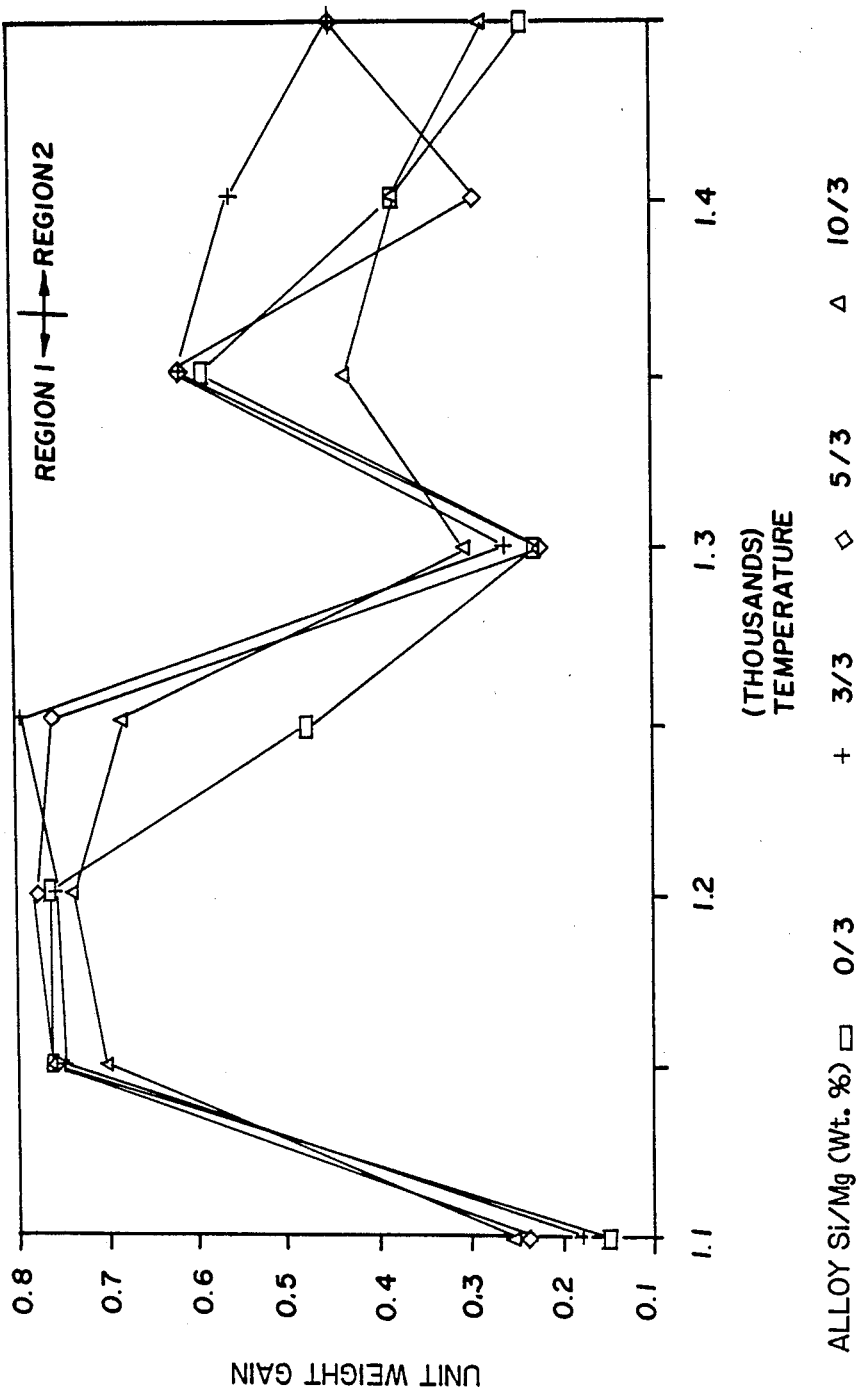

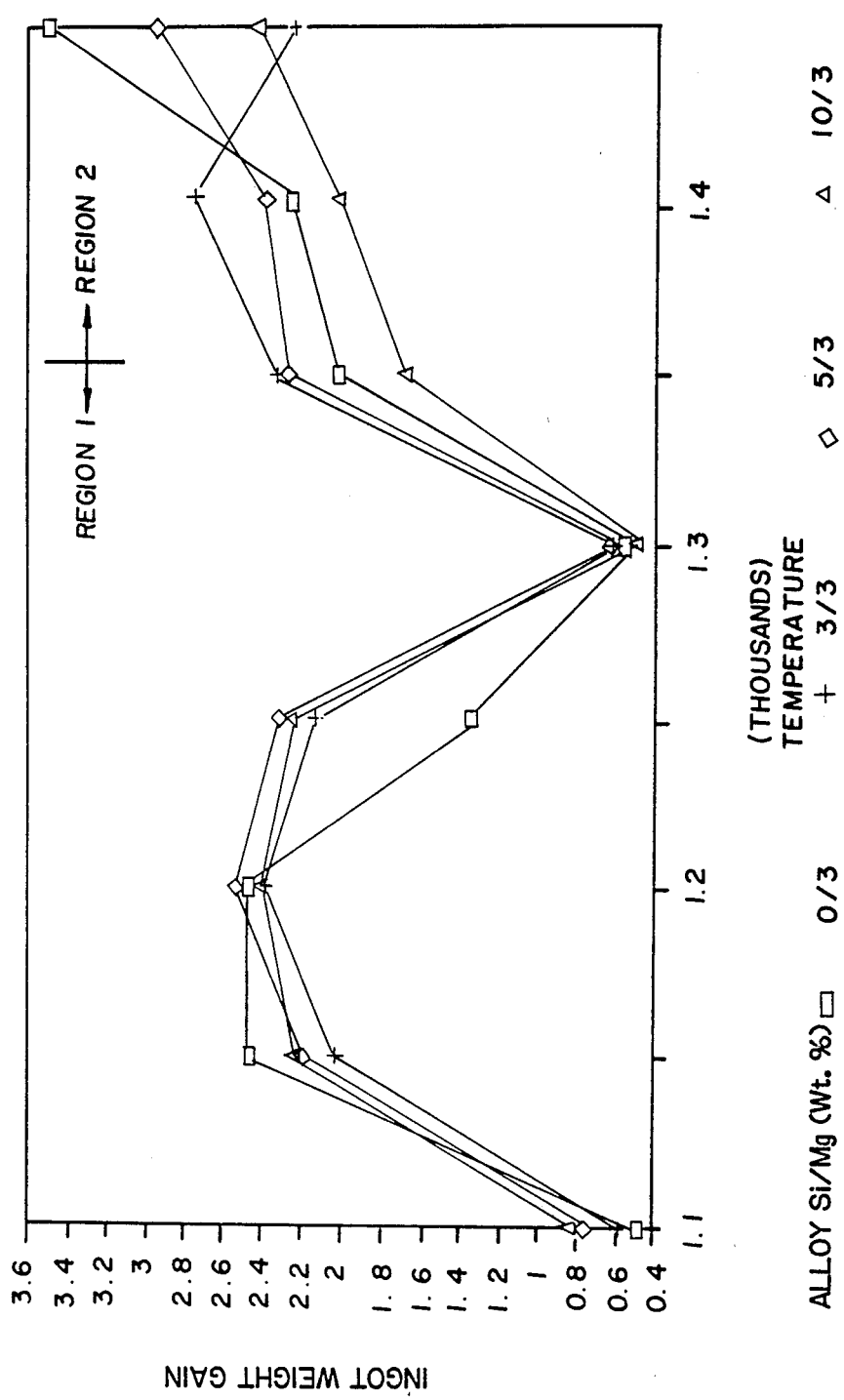

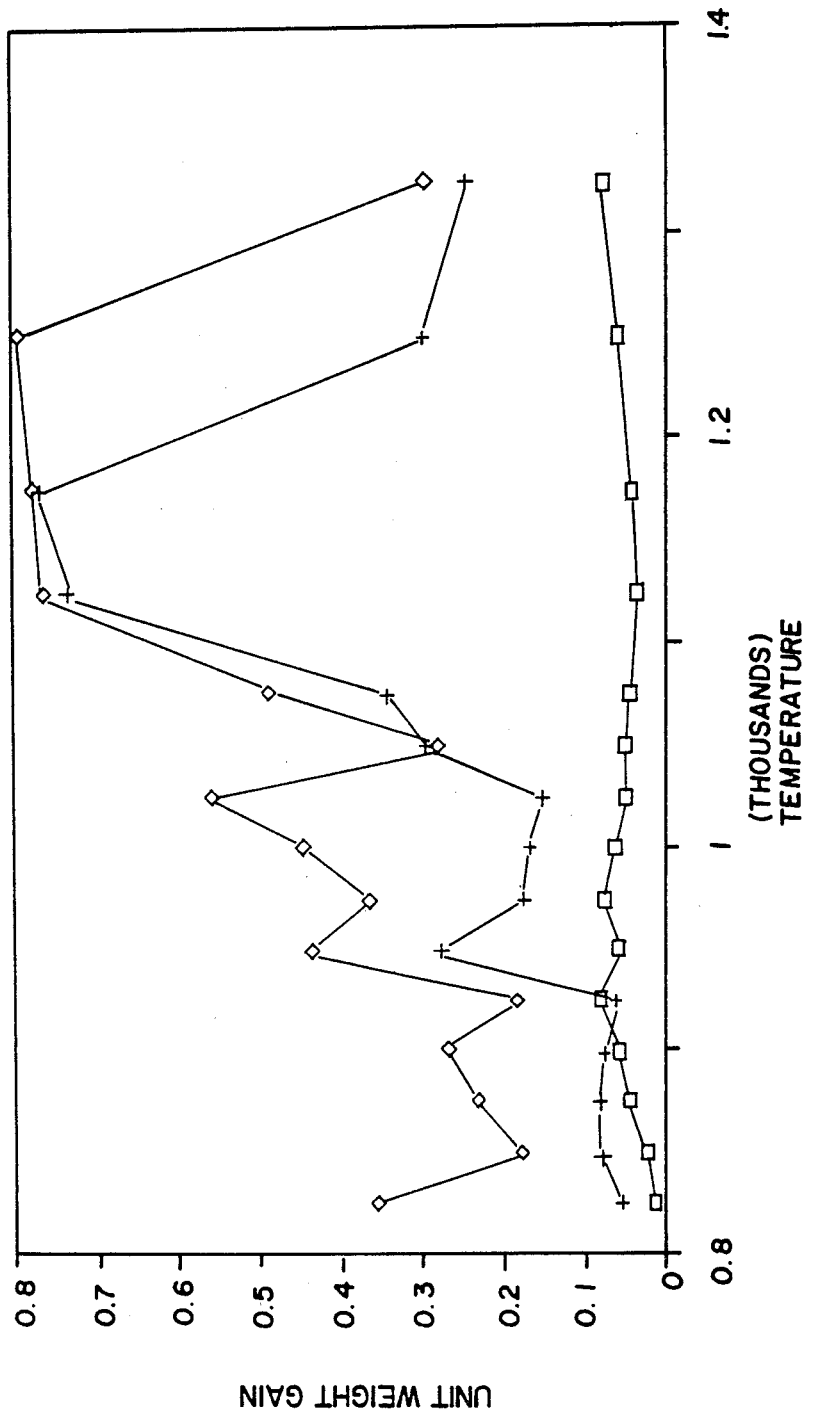

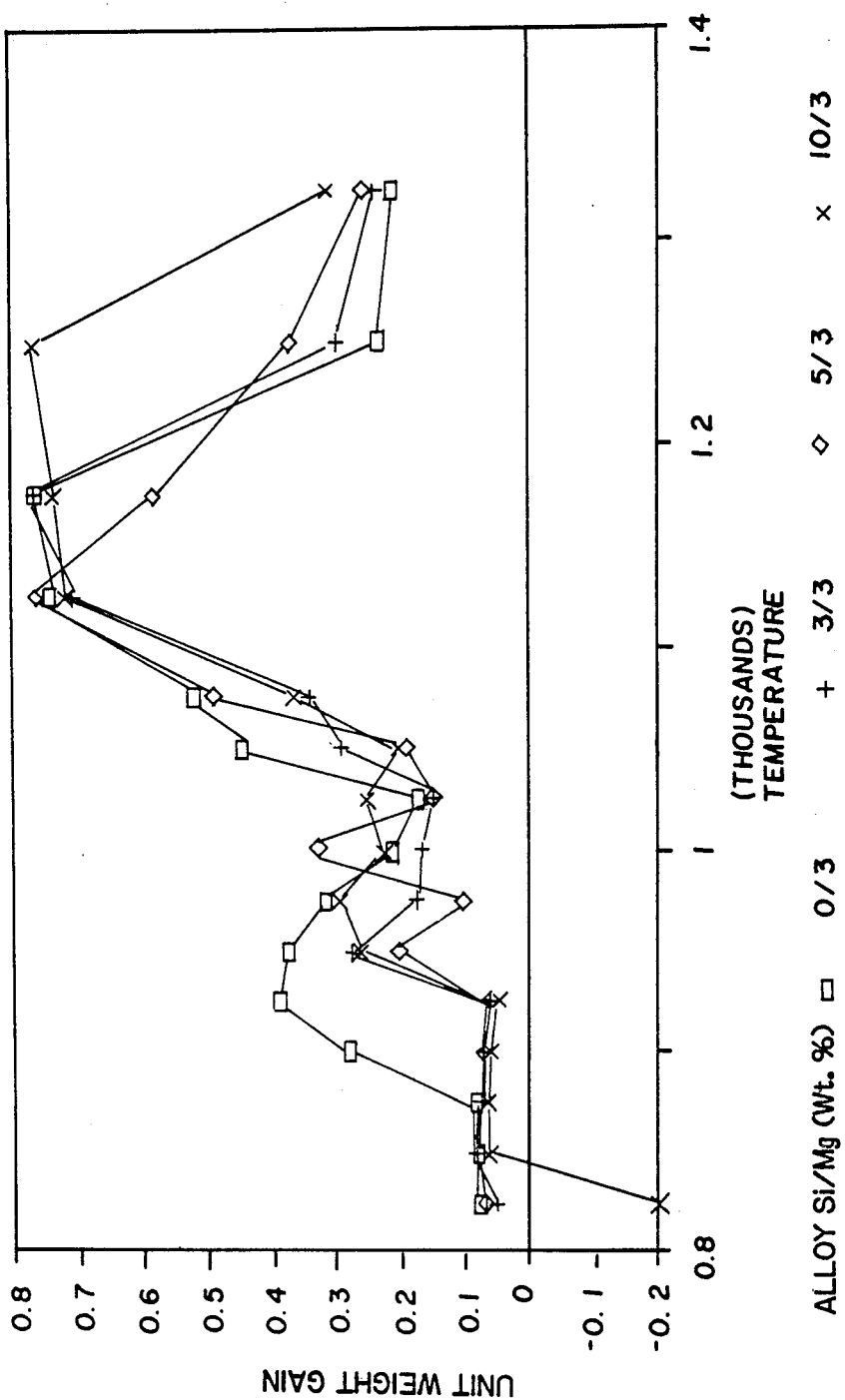

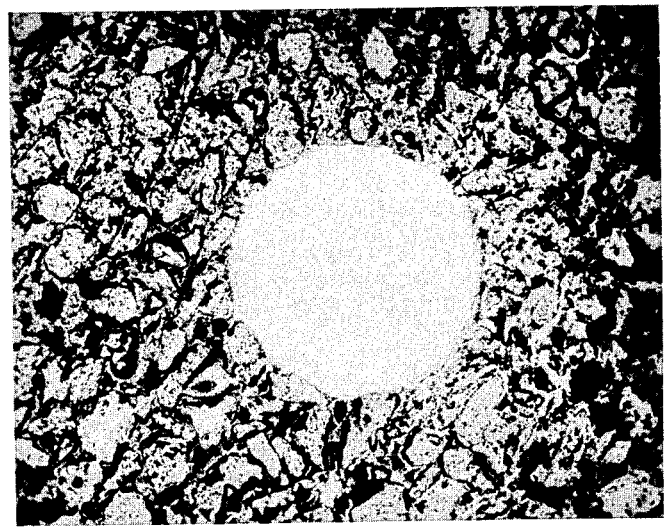
Fig. 7a
Fig. 7b
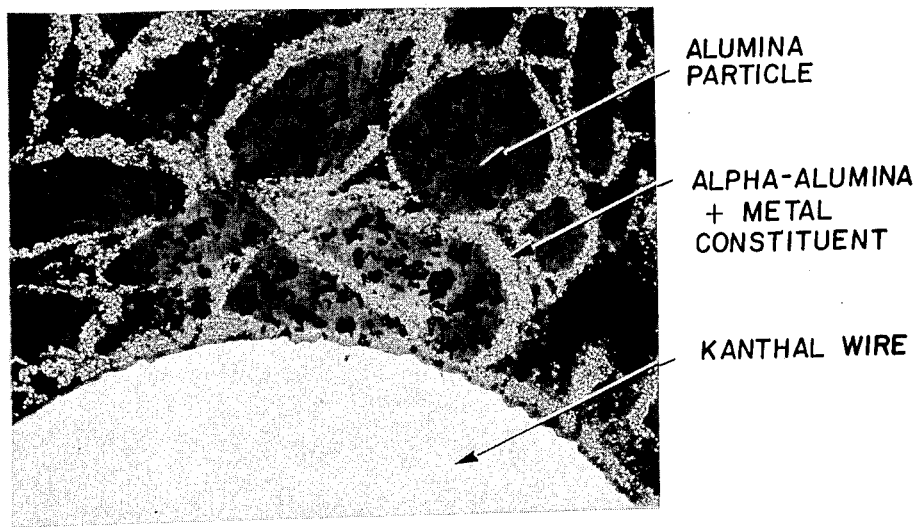
ALUMINA PARTICLE
ALPHA-ALUMINA + METAL CONSTITUENT
KANTHAL WIRE

B DENOTES ALPHA ALUMINA
MATRIX EMBEDDING SILICON
CARBIDE PARTICLES

A DENOTES SILICON
CARBIDE FIBERS

METHODS OF MAKING COMPOSITE CERAMIC ARTICLES HAVING EMBEDDED FILLER

CROSS-REFERENCE TO RELATED APPLICATIONS

This application is a continuation-in-part of commonly owned and copending U.S. Pat. application Ser. No. 697,876 filed Feb. 4, 1985 in the name of Marc S. Newkirk et al and entitled "Composite Ceramic Articles And Methods of Making Same".

BACKGROUND OF THE INVENTION

1. Field Of The Invention

The present invention broadly relates to novel composite ceramic structures and to novel methods of making the same. In particular, the invention relates to composite ceramic structures having a polycrystalline matrix surrounding or embedding substantially inert filler materials and to methods of making the structures by "growing" an oxidation reaction product from a parent metal into a permeable mass of filler material.

2. Background

Traditional methods of preparing ceramic articles do not readily lend themselves to the preparation of ceramic matrix composite materials, especially fiber- and/or wire-reinforced ceramic composite structures. A composite structure is one which comprises a heterogeneous material, body or article made of two or more different materials which are intimately combined in order to attain desired properties of the composite. For example, two different materials may be intimately combined by embedding one in a matrix of the other. A ceramic composite structure typically comprises a ceramic matrix which encloses one or more diverse kinds of filler materials such as particulates, fibers, rods or the like.

Traditional methods of preparing ceramic articles involve the following general steps: (1) Preparation of material in powder form. (2) Grinding or milling of powders to obtain very fine particles. (3) Formation of the powders into a body having the desired geometry (with allowance for shrinkage during subsequent processing). For example, this step might be accomplished by uniaxial pressing, isostatic pressing, injection molding, tape casting, slip casting or any of several other techniques. (4) Densification of the body by heating it to an elevated temperature such that the individual powder particles merge together to form a coherent structure. Preferably, this step is accomplished without the application of pressure (i.e., by sintering), although in some cases an additional driving force is required and can be provided through the application of external pressure either uniaxially (i.e., hot pressing) or isostatically, i.e., hot isostatic pressing. (5) Finishing, frequently by diamond grinding, as required.

In the preparation of ceramic matrix composite materials, the most serious difficulties with traditional methods arise in the densification step, number (4) above. The normally preferred method, pressureless sintering, can be difficult or impossible with particulate composites if the materials are not highly compatible. More importantly, normal sintering is impossible in most cases involving fiber composites even when the materials are compatible, because the merging together of the particles is inhibited by the fibers which tend to prevent the necessary displacements of the densifying powder particles. These difficulties have been, in some cases, partially overcmoe by forcing the densification process through the application of external pressure at high temperature. However, such procedures can generate many problems, including breaking or damaging of the reinforcing fibers by the external forces applied, limited capability to produce complex shapes (especially in the case of uniaxial hot pressing), and generally high costs resulting from low process productivity and the extensive finishing operations sometimes required.

Additional difficulties can also arise in the body formation step, number (3) above, if it is desired to maintain a particular distribution of the composite second phase within the matrix. For example, in the preparation of a fibrous ceramic composite, the powder and fiber flow processes involved in the formation of the body can result in non-uniformities and undesired orientations of the reinforcing fibers, with a consequent loss in performance characteristics.

Other methods are also used as means for forming ceramic matrix composites. For example, the formation of a matrix structure by the reaction of gaseous species to form the desired ceramic (a process known as chemical vapor deposition) is employed currently for silicon carbide fiber-reinforced silicon carbide matrix composites. This method has met with only limited success, partly because the matrix deposition process tends to occur on all of the composite second phase surfaces at once, such that matrix development only occurs until the growing surfaces intersect, with the trapping of porosity within the body being an almost inevitable consequence. In addition, the rate of matrix deposition has been so low as to make such composites prohibitively expensive for all but the most esoteric applications.

A second non-traditional approach involves the infiltration of the composite particles or fibers with a flowable organic material containing the necessary elements to form the desired ceramic matrix. Ceramic formation occurs by chemical reaction on heating this material to an elevated temperature. Once again, limited success has been achieved, in this case because elimination of the large amounts of volatile materials (necessary constituents of the initial flowable infiltrant composition) during the heating process tends to leave behind a porous and/or cracked ceramic body.

Seufert (U.S. Pat. No. 3,437,468) discloses certain composite materials made by a reaction process with molten aluminum. However, the matrix constituent of these materials inherently contains a large amount of magnesium aluminate, a material of less desirable properties (for example, lower hardness) than certain other ceramics such as aluminum oxide. In addition, the process of the Seufert Patent requires that the ceramics be formed, in major part, by reaction of aluminum with magnesium oxide and silicon dioxide (in free or combined form) which reduces the flexibility of the process and dictates that substantial amounts of silicon (in addition to magnesium aluminate) will be present in the matrix of the final ceramic product.

Description Of Commonly Owned Patent Applications

The subject matter of this application is related to that of the following copending and Commonly Owned U.S. Pat. applications and patents: U.S. Pat. No. 4,713,360 which issued on Dec. 15, 1987 and was based on U.S. application Ser. No. 818,943 filed Jan. 15, 1986, which was a continuation-in-part of Ser. No. 776,964 filed Sept. 17, 1985, which was a continuation-in-part of Ser. No. 705,787 filed Feb. 26, 1985, which was a continuation-in-part of U.S. application Ser. No. 591,392 filed Mar. 16, 1984, all in the name of Marc S. Newkirk et al and entitled "Novel Ceramic Materials and Methods For Making the Same"; and Ser. No. 822,999, filed Jan. 27, 1986, which is a continuation-in-part of Ser. No. 776,965, filed Sept. 17, 1985, which is a continuation-in-part of Ser. No. 747,788, filed June 25, 1985, which is a continuation-in-part of Ser. No. 632,636 filed July 20, 1984, all in the name of Marc S. Newkirk et al and entitled "Methods of Making Self-Supporting Ceramic Materials". The entire disclosures of each of the aforesaid related patent applications and patents incorporated herein by reference.

The aforesaid Commonly Owned patent applications Ser. Nos. 591,392; 705,787; 776,964 and 818,943 and U.S. Pat. No. 4,713,360 disclose a novel method for producing a self-supporting ceramic body by oxidation of a parent metal (as defined below) to form an oxidation reaction product. More specifically, the parent metal is heated to an elevated temperature above its melting point but below the melting point of the oxidation reaction product in order to form a body of molten parent metal which reacts upon contact with a vapor-phase oxidant to form the oxidation reaction product. The oxidation reaction product, or at least a portion thereof which is in contact with and extends between the body of molten parent metal and the oxidant, is maintained at the elevated temperature, and molten metal is drawn through the polycrystalline oxidation reaction product and towards the oxidant, and the transported molten metal forms oxidation reaction product upon contact with the oxidant. As the process continues, additional metal is transported through the polycrystalline oxidation reaction product formation thereby continually "growing" a ceramic structure of interconnected crystallites. Usually, the resulting ceramic body will contain therein inclusions of nonoxidized constituents of the parent metal drawn through the polycrystalline material and solidified therein as the ceramic body cooled after termination of the growth process. As explained in these Commonly Owned Patent Applications, resultant novel ceramic materials are produced by the oxidation reaction between a parent metal and a vapor-phase oxidant, i.e., a vaporized or normally gaseous material, which provides an oxidizing atmosphere. In the case of an oxide as the oxidation reaction product, oxygen or gas mixtures containing oxygen (including air) are suitable oxidants, with air usually being preferred for obvious reasons of economy. However, oxidation is used in its broad sense in the Commonly Owned Patent Applications and in this application, and refers to the loss or sharing of electrons by a metal to an oxidant which may be one or more elements and/or compounds. Accordingly, elements other than oxygen may serve as the oxidant. In certain cases, the parent metal may require the presence of one or more dopants in order to favorably influence or facilitate growth of the ceramic body, and the dopants are provided as alloying constituents of the parent metal. For example, in the case of aluminum as the parent metal and air as the oxidant, dopants such as magnesium and silicon, to name but two of a larger class of dopant materials, were alloyed with the aluminum alloy utilized as the parent metal.

The aforesaid Commonly Owned patent applications Ser. Nos. 632,636; 747,788; 776,965; and 822,999 disclose a further development based on the discovery that appropriate growth conditions as described above, for parent metals requiring dopants, can be induced by externally applying a layer of one or more dopant materials to the surface or surfaces of the parent metal, thus avoiding the necessity of alloying the parent metal with dopant materials, e.g., metals such as magnesium, zinc and silicon, in the case where aluminum is the parent metal and air is the oxidant. External application of a layer of dopant material permits locally inducing metal transport through the oxidation reaction product and resulting ceramic growth from the parent metal surface or portions thereof which are selectively doped. This discovery offers a number of advantages, including the advantage that ceramic growth can be achieved in one or more selected areas of the parent metal's surface rather than indiscriminately, thereby making the process more efficiently applied, for example, to the growth of ceramic plates by doping only one surface or only portion(s) of a surface of a parent metal plate. This improvement invention also offers the advantage of being able to cause or promote oxidation reaction product growth in parent metals without the necessity of alloying the dopant material into the parent metal, thereby rendering the process feasible, for example, for application to commercially available metals and alloys which otherwise would not contain or have appropriately doped compositions.

Thus, the aforesaid commonly owned patent applications describe the production of oxidation reaction products readily "grown" to desired thicknesses heretofore believed to be difficult, if not impossible, to achieve with conventional ceramic processing techniques. The underlying metal, when raised to a certain temperature region above its melting point, and in the presence of dopants (if required) is transported through its own otherwise impervious oxidation reaction product, thus exposing fresh metal to the oxidizing environment to thereby yield further oxidation reaction product. The result of this phenomenon is the progressive growth of a dense, interconnected ceramic optionally containing some non-oxidized parent metal constituents distributed throughout the growth structure.

SUMMARY OF THE INVENTION

In accordance with the present invention, there is provided a method for producing a self-supporting ceramic composite structure comprising (1) a ceramic matrix obtained by oxidation of a parent metal, e.g., an aluminum alloy, to form a polycrystalline material consisting essentially of (i) the oxidation reaction product (e.g., alpha-aluminum oxide) of said parent metal with a vapor-phase oxidant (e.g., oxygen) and, optionally, (ii) one or more non-oxidized constituents of the parent metal; and (2) a filler embedded by the matrix.

Generally, this invention is based upon the discovery that the growth of a polycrystalline material resulting from the oxidation of a metal (hereinafter referred to as the "parent metal" and defined below) as described in the above-referenced Commonly Owned Patent Applications can be directed towards a permeable mass of filler material, sometimes herein referred to simply as "filler", which is placed adjacent the parent metal. The filler is engulfed and embedded within the growth of polycrystalline material to provide a composite ceramic structure. Under suitable process conditions, the molten parent metal oxidizes outwardly from its initial surface (i.e., the surface exposed to the oxidant) towards the oxidant and the filler by migrating through its own otherwise impermeable oxidation reaction product structure. The oxidation reaction product grows into the permeable mass of filler, which may comprise various refractory and/or non-refractory granular, fibrous, or other materials. This results in novel ceramic matrix composite structures comprising a dense matrix of a ceramic polycrystalline material embedding the filler materials.

The mass or aggregate of filler material or materials is positioned adjacent to the parent metal in the assumed path of the oxidation reaction product growth therefrom. The filler material can comprise either a loose or bonded array or arrangement of materials, which array has interstices, openings, intervening spaces, or the like, to render it permeable to the oxidant and to the oxidation reaction product growth. Further, the filler material may be homogeneous or heterogeneous, and as used herein and in the appended claims, the terms "filler" or "filler material" are intended to mean one or more materials unless indicated otherwise by the context. A matrix of the polycrystalline material resulting from the oxidation reaction product growth is simply grown around the filler material so as to embed the latter without substantially disturbing or displacing it. Thus, no external forces are involved which might damage or disturb the arrangement of the filler material and no awkward and costly high temperature, high pressure processes and facilities are required as in known conventional processes to achieve a dense composite ceramic structure. In addition, the stringent requirements of chemical and physical compatibility necessary for pressureless sintering to form ceramic composites are greatly reduced or eliminated by the present invention.

In the ceramic matrix growth process, the parent metal is heated to a temperature above its melting point but below the melting point of the oxidation reaction product thereby forming a body of molten parent metal which is reacted with the oxidant to form the oxidation reaction product. At this temperature or within this temperature range, the body of molten metal is in contact with at least a portion of the oxidation reaction product which extends between the body of molten metal and the oxidant. Molten metal is drawn through the oxidation reaction product towards the oxidant and towards the adjacent filler material to sustain the continued formation of oxidation reaction product at the interface between the oxidant and previously formed oxidation reaction product. The reaction is cntinued for a time sufficient to embed at least a portion of the filler material within the oxidation reaction product by growth of the latter, which optionally has therein inclusions of non-oxidized constituents of parent metal, to form the composite structure.

The products of the present invention generally are adaptable or fabricated, such as by machining, polishing, grinding, etc., for use as articles of commerce which, as used herein, are intended to include, without limitation, industrial, structural and technical ceramic bodies for applications where electrical, wear, thermal, structural or other features or properties are important or beneficial; and it is not intended to include recycle or waste materials such as might be produced as unwanted by-products in the processing of molten metal.

As used in this specification and the appended claims, "oxidation reaction product" means one or more metals in any oxidized state wherein the metal(s) have given up electrons to or shared electrons with another element, compound, or combination thereof. Accordingly, an "oxidation reaction product" under this definition includes the product of the reaction of one or mroe metals with an oxidant such as oxygen, nitrogen, a halogen, sulphur, phosphorus, arsenic, carbon, boron, selenium, tellurium and compounds and combinations thereof, for example, methane, ethane, propane, acetylene, ethylene, propylene and mixtures such as air, $H_2/H_2O$ and $CO/CO_2$, the latter two (i.e., $H_2/H_2O$ and $CO/CO_2$) being useful in reducing the oxygen activity of the environment.

As used herein and in the claims, reference to an "oxidant", "vapor-phase oxidant" or the like, which identifies the oxidant as containing or comprising a particular gas or vapor, emans an oxidant in which the identified gas or vapor is the sole, or predominant, or at least a significant oxidizer of the parent metal under the conditions obtaining in the oxidizing environment utilized. For example, although the major constituent of air is nitrogen, the oxygen content of air is the sole or predominant oxidizer for the parent metal because oxygen is a significantly stronger oxidant than nitrogen. Air therefore falls within the definition of an "oxygen-containing gas" oxidant but not within the definition of a "nitrogen-containing gas" oxidant as those terms are used herein and in the claims. An example of a "nitrogen-containing gas" oxidant as used herein and in the claims is "forming gas", which typically contains about 96 volume percent nitrogen and about 4 volume percent hydrogen.

The term "parent metal" as used in this specification and the appended claims refers to that metal, e.g., aluminum, which is the precursor of the polycrystalline oxidation reaction product and includes that metal or a relatively pure metal, a commercially available metal having impurities and/or alloying constituents therein, and an alloy in which that metal precursor is the major constituent, and when a specific metal is mentioned as the parent metal, e.g., aluminum, the metal identified should be read with this definition in mind unless indicated otherwise by the context. Although the invention is described herein with particular emphasis on aluminum as the parent metal, other metals which meet the criteria of the invention are also suitable, such as silicon, titanium, tin and zirconium.

The term "ceramic" as used in this specification and the appended claims is not limited to a ceramic body in the classical sense, that is, in the sense that it consists entirely of non-metallic and inorganic materials but, rather, it refers to a body which is predominantly ceramic with respect to either composition or dominant properties, although the body may contain substantial amounts of one or more metals derived from the parent metal, most typically within a range of from about 1–40% by volume, but may include still more metal.

BRIEF DESCRIPTION OF THE DRAWINGS

FIGS. 2A–2D are graphs showing relative ingot weight gain and relative unit weight gain (as explained below) for a doped aluminum parent metal/filler material assembly treated in accordance with aspects of the present invention;

FIGS. 3A-3D are graphs showin relative weight gains of various aluminum alloys treated in accordance with the present invention to embed in the oxidation reaction product thereof a particulate filler material of low purity;

FIGS. 4A-4D are graphs showing relative ingot weight gain and relative unit weight gain for an aluminum parent metal assembly treated in accordance with the present invention to embed in the oxidation reaction product thereof 325 mesh magnesium aluminate spinel filler material;

FIGS. 5A-5D are graphs showing relative ingot weight gain and relative unit weight gain for an aluminum parent metal assembly treated in accordance with the present invention to embed in the oxidation reaction product thereof 90 mesh, 98% pure SiC filler material;

FIGS. 6A-6D are graphs showing relative ingot weight gain and relative unit weight gain for an aluminum parent metal treated in accordance with the present invention to embed in the oxidation reaction product thereof 90 mesh, 99% pure SiC filler material;

FIGS. 7A-7B are photomicrographs at 40× and 200× magnifications of a ceramic composite structure in accordance with the present invention containing wire and alumina particles embedded as filler materials in an alumina ceramic;

DETAILED DESCRIPTION OF THE INVENTION AND PREFERRED EMBODIMENTS THEREOF

Figure 1A:
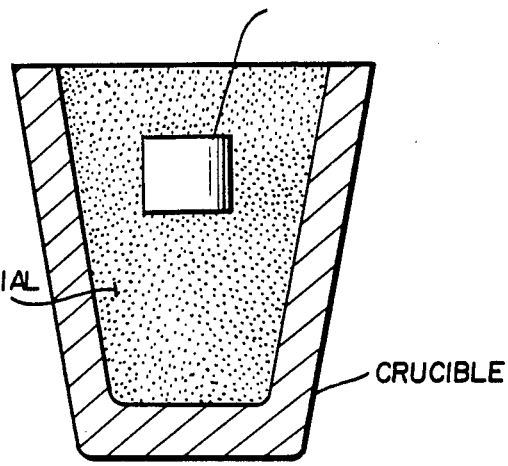
FIG. 1A is a schematic, vertical cross-sectional view showing an assembly of a parent metal ingot surrounded by a particulate filler material and confined within a refractory vessel.

In the practice of the present invention, the parent metal, which, for example, may comprise aluminum, silicon, zirconium, tin or titanium, and a permeable mass of filler material are positioned adjacent to each other and oriented with respect to each other so that growth of the oxidation reaction product will be in a direction towards the filler material in order that the filler material, or a part thereof, will be infiltrated by the growing oxidation reaction product and embedded therein. This positioning and orientation of the parent metal and filler material with respect to each other may be accomplished by simply embedding a body of parent metal within a bed of particulate filler material as illustrated in FIG. 1A or by positioning one or more bodies of parent metal within, on or adjacent to a bed or other assembly of filler material. The filler may comprise, for example, a lattice of reinforcing rods, bars, wires, plates, platelets, hollow bodies, a bed of spheres (solid or hollow bubbles), powders or other particulates, aggregate, refractory fiber cloth, wire cloth, steelwool, fibers, tubes, tubules, pellets, whiskers, or the like, or a combination of the foregoing. The assembly is, in any case, arranged so that a direction of growth of the oxidation reaction product will be towards the filler material, and the oxidation reaction product will permeate or engulf at least a portion of the filler material such that void space between filler particles or articles will be filled in by the grown oxidation reaction product matrix.

When one or more dopant materials (described below) are required or desirable to promote or facilitate growth of the oxidation reaction product, the dopant may be used on and/or in the parent metal and, alternatively or in addition, the dopant may be used on, or be provided by, the filler material.

Although the present invention is hereinafter described with particular emphasis on aluminum and specific embodiments of aluminum as the parent metal, this reference is for exemplary purposes only, and it is to be understood that other metals such as silicon, titanium, tin, zirconium, etc., also can be employed which meet, or can be doped to meet, the criteria of the invention.

In the case of employing aluminum or its alloys as the parent metal and an oxygen-containing gas as the oxidant in the process of the present invention, the appropriate amounts of dopants are alloyed into or applied to the parent metal, as described below in greater detail. The parent metal is then placed in a crucible or other refractory container with the metal surface exposed to an adjacent or surrounding mass of permeable filler material in said container and in the presence of an oxidizing atmosphere (typically air at ambient atmospheric pressure). The resulting assembly is then heated within a furnace to elevate the temperature thereof into the region typically between about 850° C. to about 1450° C., or more preferably, between about 900° C. to about 1350° C. depending upon the filler material, dopant or the dopant concentrations, or the combination of any of these whereupon the parent metal transport begins to occur through the oxide skin normally protecting the aluminum parent metal.

The continued high temperature exposure of the parent metal to the oxidant allows the continued oxidation of parent metal to form a polycrystalline reaction product layer of increasing thickness. This growing oxidation reaction product progressively impregnates the permeable adjacent filler material with an interconnected oxidation reaction product matrix which also may contain non-oxidized parent metal constituents, thus forming a cohesive composite. The growing polycrystalline matrix impregnates or permeates the filler material at a substantially constant rate (that is, a substantially constant rate of thickness increase over time), provided sufficient air (or oxidizing atmosphere) interchange is allowed in the furnace to keep a relatively constant source of oxidant therein. Interchange of oxidizing atmosphere, in the case of air, can be conveniently provided by vents in the furnace. Growth of the matrix continues until at least one of the following occurs: (1) substantially all of the parent metal is consumed; (2) the oxidizing atmosphere is replaced by nonoxidizing atmosphere, is depleted of oxidant, or evacuated; or (3) the reaction temperature is altered to be substnatially outside the reaction temperature envelope, e.g., below the melting point of the parent metal. Usually, the temperature is reduced by lowering the furnace temperature, and then the material is removed from the furnace.

Examples of fillers useful in the invention, depending upon parent metal and oxidation systems chosen, include one or more of aluminum oxide, silicon carbide, silicon aluminum oxynitride, zirconium oxide, zirconium boride, titanium nitride, barium titanate, boron nitride, silicon nitride, ferrous alloys, e.g., iron-chromium-aluminum alloy, carbon, aluminum and mixtures thereof. However, any suitable filler may be employed in the invention, and three specific classes of useful fillers may be identified.

The first class of fillers contains those chemical species which, under the temperature and oxidizing conditions of the process, are not volatile, are thermodynamically stable and do not react with or dissolve excessively in the molten parent metal. Numerous materials are known to those skilled in the art as meeting such criteria in the case where aluminum parent metal and air or oxygen as the oxidant are employed. Such materials include the single-metal oxides of: aluminum, $Al_2O_3$; cerium, $CeO_2$; hafnium, $HfO_2$; lanthanum, $La_2O_3$; neodymium, $Nd_2O_3$; praseodymium, various oxides; samarium, $Sm_2O_3$; scandium, $Sc_2O_3$; thorium, $ThO_2$; uranium, $UO_2$; yttrium, $Y_2O_3$; and zirconium, $ZrO_2$. In addition, a large number of binary, ternary, and higher order metallic compounds such as magnesium aluminate spinel, $MgO\cdot Al_2O_3$, are contained in this class of stable refractory compounds.

The second class of suitable fillers are those which are not intrinsically stable in the oxidizing and high temperature environment of the process, but which, due to relatively slow kinetics of the degradation reactions, can be incorporated as a filler phase within the growing ceramic body. An example in the case of an alumina ceramic matrix is silicon carbide. This material would oxidize completely under the conditions necessary to oxidize aluminum with oxygen or air in accordance with the invention were it not for a protective layer of silicon oxide forming and covering the silicon carbide particles to limit further oxidation of the silicon carbide.

A third class of suitable fillers are those which are not, on thermodynamic or on kinetic grounds, expected to survive the oxidizing environment or exposure to molten metal necessary for practice of the invention. Such fillers can be made compatible with the process of the present invention (1) if the oxidizing environment is made less active, or (2) through the application of a coating thereto, which makes the species kinetically non-reactive in the oxidizing environment. An example of such a class of fillers would be carbon fiber employed in conjunction with a molten aluminum parent metal. If the aluminum is to be oxidized with air or oxygen at, for example, 1250° C., to generate a matrix incorporating the fiber, the carbon fiber will tend to react with both the aluminum (to form aluminum carbide) and the oxidizing environment (to from CO or $CO_2$). These unwanted reactions may be avoided by coating the carbon fiber (for example, with alumina) to prevent reaction with the parent metal and/or oxidant and optionally employing a $CO/CO_2$ atmosphere as oxidant which tends to be oxidizing to the aluminum but not to the carbon fiber.

By way of explanation of the oxidation process but not wishing to be bound thereby, the molten metal is transported along channels at certain high energy grain intersections of the oxidation reaction product phase. It is well understood that any polycrystalline material exhibits a range of grain boundary energies (surface free energies) depending upon the degree of lattice misalignment at the interface between two adjacent crystals or grains of the same material. In general, grain boundaries of low angular misalignment exhibit low surface energies, while high angle boundaries have high surface energies, although the relationship may not be a simple, monotonically increasing function of the angle due to the occasional occurrence of more favorable atomic alignments at intermediate angles. Similarly, the lines along which three grains intersect also typically are high energy features in a polycrystalline microstructure.

As further explained in the aforesaid Commonly Owned Patent Applications, but not wishing to be bound thereby, the parent metal and oxidant apparently form a favorable polycrystalline oxidation reaction product having a surface free energy relationship with the molten parent metal such that within some portion of a temperature region in which the parent metal is molten, at least some of the grain intersections (i.e., grain boundaries or three-grain-intersections) of said polycrystalline oxidation reaction product are replaced by planar or linear channels of molten metal. For example, consider a grain boundary having a surface free energy greater than the alternative configuration of two substantially geometrically equivalent crystal/molten metal interface boundaries. In these circumstances, such a high energy grain boundary either will not form or will spontaneously decompose in favor of a planar channel of molten metal bounded by two crystal/metal interfaces. When the molten metal is maintained in the oxidizing environment and within the effective portion of the temeprature region, molten metal is drawn or transported along such channels in the direction of the oxidant. More specifically, this phenomenon occurs when (1) the liquid metal wets the crystalline oxidation reaction product phase (i.e., $\gamma_{SL} < \gamma_{SG}$, where $\gamma_{SL}$ denotes the surface free energy of the crystal/molten metal interface and $\gamma_{SG}$ denotes the surface free energy of the crystal/vapor interface), and (2) the energy of some of the grain boundaries, $\gamma_B$, is greater than twice the crystal/liquid metal interfacial energy, i.e., $\gamma_{BMAX} > 2\gamma_{SL}$ where $\gamma_{BMAX}$ is the maximum grain boundary energy of the polycrystalline material. Molten metal channels of linear character can be formed in a similar way if metal replaces some or all of the three-grain-intersections in the material.

Since the channels are at least partially interconnected, (i.e., the grain boundaries of the polycrystalline material are interconnected), molten metal is transported through the polycrystalline oxidation reaction product to its surface into contact with the oxidizing atmosphere, where the metal undergoes oxidation resulting in the continual growth of the oxidation reaction product. Furthermore, since the wicking of molten metal along channels is a much faster transport process than the ionic conduction mechanisms of most normal oxidation phenomena, the growth rate observed for the oxidation reaction product with this oxidation process is much faster than that typically observed in other oxidation phenomena.

While the oxidation reaction product of the present invention is interpenetrated by metal along high energy grain intersections, the polycrystalline reaction product phase is itself interconnected in one or more dimensions, preferably in three dimensions, along relatively low angle grain broundaries which do not meet the criterion $\gamma_B > 2\gamma_{SL}$. Thus, the product of this invention exhibits many of the desirable properties of the classical ceramic (i.e., hardness, refractoriness, wear resistance, etc.) while deriving additional benefits from the presence of the distributed metal phase (notably higher toughness and resistance to fracture).

In another aspect of the invention, there is provided a self-supporting ceramic composite comprising a ceramic matrix and filler material incorporated within the matrix. The matrix, which may be obtained by oxidation of a molten parent metal with a vapor-phase oxidant to form a polycrystalline oxidation reaction product, is characterized by an essentially single phase polycrystalline oxidation reaction product and distributed metal or voids or both, and by crystal lattice misalignments at oxidation reaction product crystallite grain boundaries less than the lattice misalignments between those neighboring oxidation reaction product crystallites having planar metal channels or planar voids, or both, disposed between said neighboring crystallites. In certain embodiments, substantially all of the grain boundaries in said oxidation reaction product phase have an angular mismatch between adjacent crystal lattices of less than about 5 degrees.

Certain parent metals under specific conditions of temperature and oxidizing atmosphere meet the criteria necessary for the oxidation phenomenon of the present invention with no special additions or modifications. However, as described in the aforesaid Commonly Owned Patent Applications, dopant materials used in combination with the parent metal can favorably influence or promote the oxidation reaction process. While not wishing to be bound by any particular theory or explanation of the function of the dopants, it appears that some of them are useful in those cases where appropriate surface energy relationships between the parent metal and its oxidation reaction product do not intrinsically exist. Thus, certain dopants or combinations of dopants, which reduce the solid-liquid interfacial energy, will tend to promote or accelerate the development of the polycrystalline structure formed upon oxidation of the metal into one containing channels for molten metal transport, as required for the new process. Another function of the dopant materials may be to initiate the ceramic growth phenomenon, apparently either by serving as a nucleating agent for the formation of stable oxidation product crystallites, or by disrupting an initially passive oxidation product layer in some fashion, or both. This latter class of dopants may not be necessary to create the ceramic growth phenomenon of the present invention, but such dopants may be important in reducing any incubation period for the initiation of such growth to within commercially practical limits for certain parent metal systems.

The function or functions of the dopant material can depend upon a number of factors other than the dopant material itself. These factors include, for example, the particular parent metal, the end product desired, the particular combination of dopants when two or more dopants are used, the use of an externally applied dopant in combination with an alloyed dopant, the concentration of the dopant, the oxidizing environment, and the process conditions.

The dopant or dopants (1) may be provided as alloying constituents of the parent metal, (2) may be applieed to at least a portion of the surface of the parent metal, or (3) may be applied to or supplied by the filler or a part of the filler bed, or any combination of two or more techniques (1), (2) and (3) may be employed. For example, an alloyed dopant may be used in combination with an externally applied dopant. In the case of technique (3), where a dopant or dopants are applied to the filler, the application may be accomplished in any suitable manner, such as by dispersing the dopants throughout part or the entire mass of filler in fine-droplet or particulate form, preferably in a portion of the bed of filler adjacent the parent metal. Application of any of the dopants to the filler may also be accomplished by applying a layer of one or more dopant materials to and within the bed, including any of its internal openings, interstices, passageways, intervening spaces, or the like, that render it permeable. A sourvce of the dopant may also be provided by placing a rigid body containing the dopant in contact with and between at least a portion of the parent metal surface and the filler bed. For example, if a silicon dopant is required, a thin sheet of silicon-containing glass or other material can be placed upon a surface of the parent metal onto which a second dopant had been previously applied. When the parent metal overlaid with the silicon-containing material is melted in an oxidizing environment (e.g., in the case of aluminum in air, between about 850° C. to about 1450° C., preferably about 900° C. to about 1350° C.), growth of the polycrystalline ceramic material into the permeable filler occurs. In the case where the dopant is externally applied to at least a portion of the surface of the parent metal, the polycrystalline oxide structure generally grows within the permeable filler substantially beyond the dopant layer (i.e., to beyond the depth of the applied dopant layer). In any case, one or more of the dopants may be externally applied to the parent metal surface and/or to the permeable bed of filler. Additionally, dopants alloyed within the parent metal and/or externally applied to the parent metal may be augmented by dopant(s) applied to the filler bed. Thus, any concentration deficiencies of the dopants alloyed within the parent metal and/or externally applied to the parent metal may be augmented by additional concentration of the respective dopant(s) applied to the bed, and vice versa.

Useful dopants for an aluminum parent metal, particularly with air as the oxidant, include, for example, magnesium metal and zinc metal, in combination with each other or in combination with other dopants described below. These metals, or a suitable source of the metals, may be alloyed into the aluminum-based parent metal at concentrations for each of between about 0.1–10% by weight based on the total weight of the resulting doped metal. The concentration range for any one dopant will depend on such factors as the combination of dopants and the process temperature. Concentrations within this range appear to initiate the ceramic growth, enhance metal transport and favorably influence the growth morphology of the resulting oxidation reaction product.

Other dopants which are effective in promoting polycrystalline oxidation reaction product growth, for aluminum-based parent metal systems are, for example, silicon, germanium, tin and lead, especially when used in combination with magnesium or zinc. One or more of these other dopants, or a suitable source of them, is alloyed into the aluminum parent metal system at concentrations for each of from about 0.5 to about 15% by weight of the total alloy; however, more desirable growth kinetics and growth morphology are obtained with dopant concentrations in the range of from about 1–10% by weight of the total parent metal alloy. Lead as a dopant is generally alloyed into the aluminum-based parent metal at a temperature of at least 1000° C. so as to make allowances for its low solubility in aluminum; however, the addition of other alloying components, such as tin, will generally increase the solubility of lead and allow the alloying materials to be added at a lower temperature.

One or more dopants may be used depending upon the circumstances, as explained above. For example, in the case of an aluminum parent metal and with air as the oxidant, particularly useful combinations of dopants include (a) magnesium and silicon or (b) magnesium, zinc and silicon. In such examples, a preferred magnesium concentration falls within the range of from about 0.1 to about 3% by weight, for zinc in the range of from about 1 to about 6% by weight, and for silicon in the range of from about 1 to about 10% by weight.

Additional examples of dopant materials, useful with an aluminum parent metal, include sodium, lithium, calcium, boron, phosphorus and yttrium, which may be used individually or in combination with one or more other dopants depending on the oxidant and process conditions. Sodium and lithium may be used in very small amounts in the parts per million range, typically about 100-200 parts per million, and each may be used alone or together, or in combination with other dopant(s). Rare earth elements such as cerium, lanthanum, praseodymium, neodymium and samarium are also useful dopants, and herein again especially when used in combination with other dopants.

As noted above, it is not necessary to alloy any dopant material into the parent metal. For example, selectively applying one or more dopant materials in a thin layer to either all, or a portion of, the surface of the parent metal enables local ceramic growth from the parent metal surface or portions thereof and lends itself to growth of the polycrystalline ceramic material into the permeable filler in selected areas. Thus, growth of the polycrystalline ceramic material into the permeable bed can be controlled by the localized placement of the dopant material upon the parent metal surface. The applied coating or layer of dopant is thin relative to the thickness of the parent metal body, and growth or formation of the oxidation reaction product into the permeable bed extends to substantially beyond the dopant layer, i.e., to beyond the depth of the applied dopant layer. Such layer of dopant material may be applied by painting, dipping, silk screening, evaporating, or otherwise applying the dopant material in liquid or paste form, or by sputtering, or by simply depositing a layer of a solid particulate dopant or a solid thin sheet or film of dopant onto the surface of the parent metal. The dopant material may, but need not, include either organic or inorganic binders, vehicles, solvents, and/or thickeners. More preferably, the dopant materials are applied as powders to the surface of the parent metal or dispersed through at least a portion of the filler. One particularly preferred method of applying the dopants to the parent metal surface is to utilize a liquid suspension of the dopants in a water/organic binder mixture sprayed onto a parent metal surface in order to obtain an adherent coating which facilitates handling of the doped parent metal prior to processing.

The dopant materials when used externally are usually applied to a portion of a surface of the parent metal as a uniform coating thereon. The quantity of dopant is effective over a wide range relative to the amount of parent metal to which it is applied and, in the case of aluminum, experiments have failed to identify either upper or lower operable limits. For example, when utilizing silicon in the form of silicon dioxide externally applied as the dopant for an aluminum-based parent metal using air or oxygen as the oxidant, quantities as low as 0.0001 gram of silicon per gram of parent metal together with a second dopant providing a source of magnesium and/or zinc produce the polycrystalline ceramic growth phenomenon. It also has been found that a ceramic structure is achievable from an aluminum-based parent metal using air or oxygen as the oxidant by using MgO as the dopant in an amount greater than 0.0005 gram of dopant per gram of parent metal to be oxidized and greater than 0.005 gram of dopant per square centimeter of parent metal surface upon which the MgO is applied. It appears that to some degree an increase in the quantity of dopant materials will decrease the reaction time necessary to produce the ceramic composite, but this will depend upon such factors as type of dopant, the parent metal and the reaction conditions.

Another important feature of this invention is the ability to influence and control the microstructure and properties of the resultant ceramic matrix by modifying the process conditions. Thus, for example, maintaining process conditions which apparently decrease the solid-liquid interfacial energy relative to the range of grain boundary energies in the oxidation reaction product will produce a structure which contains an increased amount of metal and a reduced degree of interconnectivity of the oxidation reaction product, whereas, a change of relative surface energies in the opposite direction produces a more interconnected oxidation reaction product with less metal phase, i.e., fewer metal transport channels are formed. Such changes may be effected, for example, by changing the nature or concentration of the dopants or by changing the oxidizing environment (temperature and atmosphere). As a consequence of this process feature, the properties of the resultant material can be tailored to a relatively high degree from properties approaching those of a pure ceramic to properties (such as toughness and electrical conductivity) which are highly influenced by the presence of 25 to 30 percent by volume or more of the metal phase.

Where the parent metal is aluminum internally doped with magnesium and the oxidizing medium is air or oxygen, it has been observed that magnesium is at least partially oxidized out of the alloy at temperatures of from about 820° to 950° C. In such instances of magnesium-doped systems, the magnesium forms a magnesium oxide and/or magnesium aluminate spinel phase at the surface of the molten aluminum alloy and during the growth process such magnesium compounds remain primarily at the initial oxide surface of the parent metal alloy (i.e., the "initiation surface") in the growing ceramic structure. Thus, in such magnesium-doped systems, an aluminum oxide-based structure is produced apart from the relatively thin layer of magnesium aluminate spinel at the initiation surface. Where desired, this initiation surface can be readily removed as by grinding, machining, polishing or grit blasting.

Non-functional alloy constituents in the parent metal, especially those which exhibit a less negative free energy of formation for their oxides, are often innocuous and tend to become concentrated in the remaining metallic inclusion phases. For example, in the case of aluminum parent metal, minor amounts of manganese, iron, copper, tungsten and other metals are common alloy impurities in commercial grades of aluminum which are compatible and do not interfere with the growth mechanism of a ceramic structure by the process of the present invention.

Figure 5B:
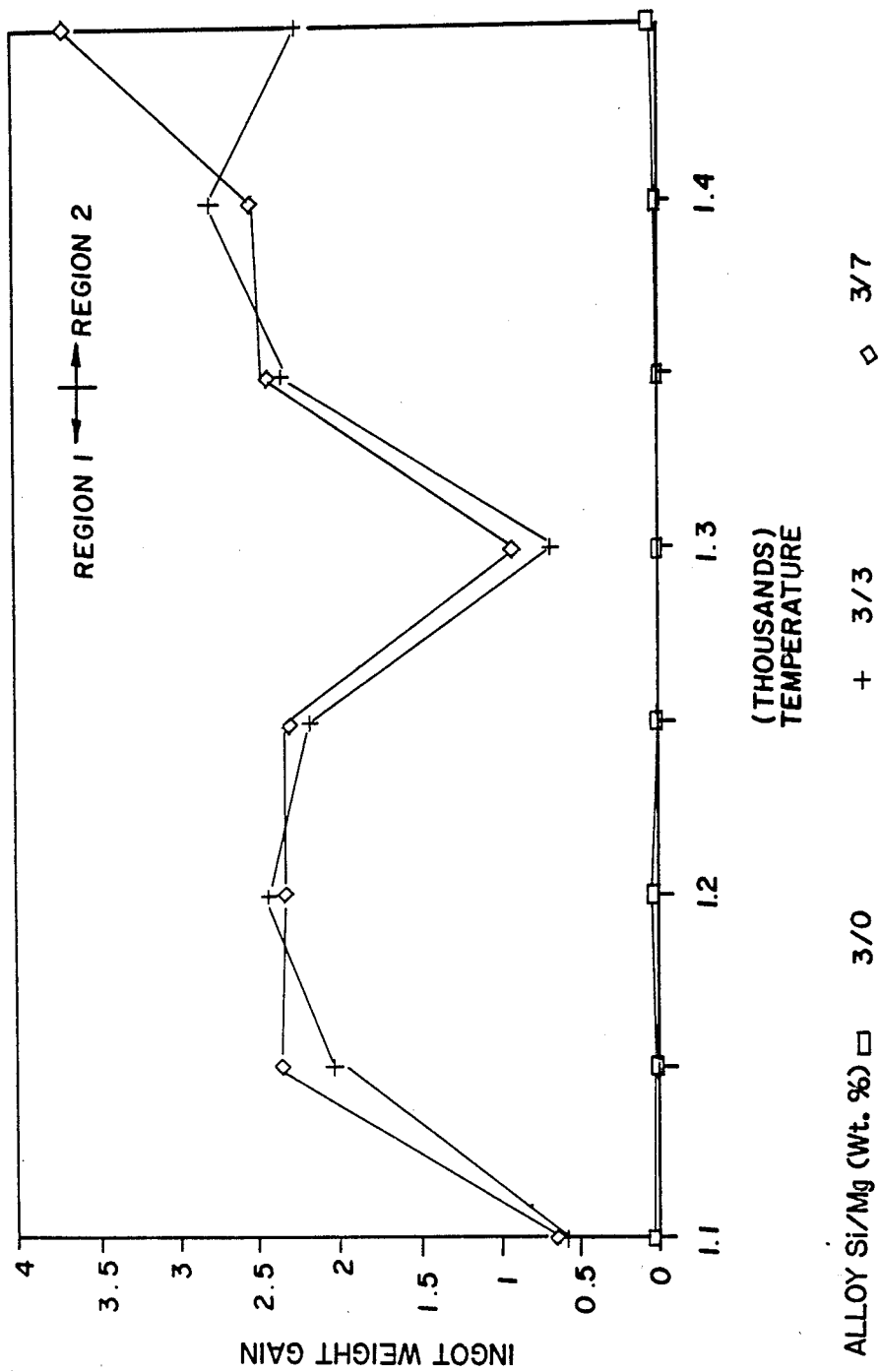
Figure 5E:
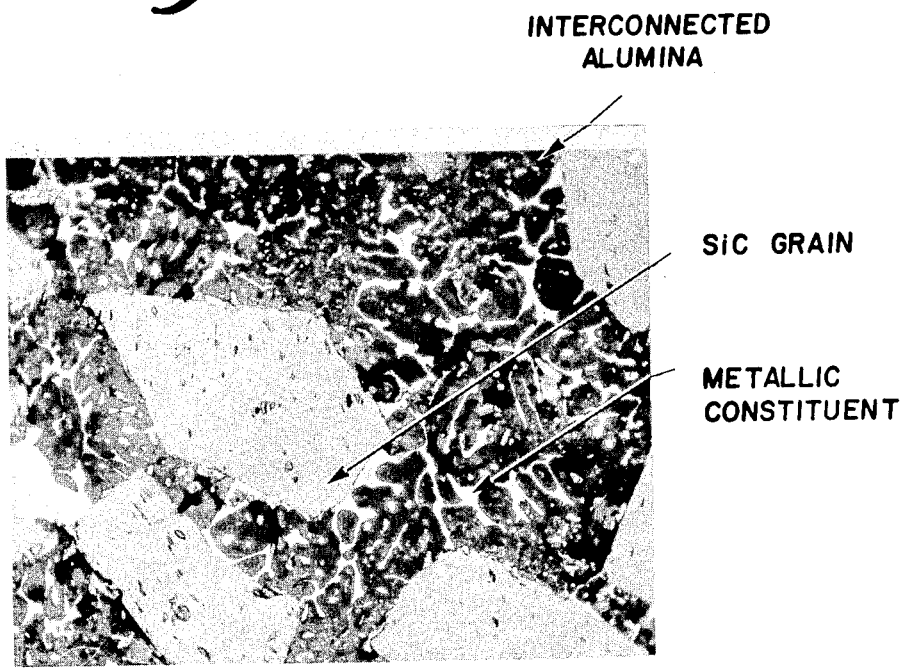
FIG. 5E is a photomicrograph taken at 400× magnification of a ceramic composite structure produced in accordance with Example 5 of this specification.

From the photomicrograph of a cross-sectio of an alumina ceramic matrix product of FIG. 5E, it will be observed that the interface boundaries between the oxidation reaction product and the metallic phases are substantially arcuate and they weave or form a tortuous microstructure through the network. This microstructure also has been observed when voids were formed in place of metal. In ceramic matrix composite materials of the prior art, when the skeleton of the matrix is a single phase, the interfaces between matrix crystallites and voids are substantially faceted, that is, more angular and ragged. A ceramic product having a predominance of arcuate or rounded interface boundaries, as in the product of the present invention, may be particularly advantageous for certain applications because one would expect a lower degree of stress concentration and a lower elastic modulus than from a typical interconnected structure that did not have this type of arcuate structure. In certain embodiments, the ceramic composite products of the present invention have an essentially single phase, interconnected, ceramic matrix skeletal structure wherein the grain boundaries at the interconnection of the crystallites composite in the skeletal structure have no other phase present. The formation of such ceramic composite products with clean grain boundaries by sintering is either difficult or impossible because impurities tend to be deposited at grain boundaries in a sintering process. Such impurities may be present either unintentionally or as deliberate additions to promote sintering or to restrict grain growth during high temperature processing. Further, clean grain boundaries in the matrix skeletal structure of a product of this character are significant because they afford superior properties such as high temperature strength retention and creep resistance.

In another embodiment, the ceramic composite of this invention is a dense, coherent body having between about 5% and about 98% by volume relative to the total volume of composite of one or more of the filler materials within a ceramic matrix. The ceramic matrix, based on its total weight, will be comprised of about 60% to about 99% by weight of interconnected aluminum oxide or aluminum nitride and about 1% to about 40% by weight of an aluminum-containing metallic constituent and which will additionally have less than about 30% by weight, preferably less than 10%, of magnesium aluminate spinel as an initiation surface.

In another aspect of the invention there is provided a composite consisting of (a) one single phase, three-dimensionally interconnected ceramic matrix of a nitride, (b) one or more metallic constituents and, optionally, voids dispersed and/or extending through the matrix, and (c) one or more fillers embedded by the matrix. Examples are given hereafter in the case of aluminum nitride, zirconium nitride, titanium nitride and silicon nitride matrix composites. Such composites are unique and tend to be advantageous due to their combined mechanical, thermal and electrical properties.

The following examples illustrate the practice of certain aspects of the invention. In examples involving the formation of aluminum oxide ceramic matrices, the oxidation reaction was observed to proceed at a moderate rate, such that there was no noticeable temperature increase arising from the exothermic nature of the reaction. However, for each of the other matrix systems described, the oxidation reaction tended to be faster, such that transient heating of the experimental assembly above the furnace setpoint temperature was commonly observed.

EXAMPLE 1

To examine the effect of growth of an oxidation reaction product of the present inventnion through a volume of filler material comprising alumina particulate matter, selected aluminum alloys containing a range of the internal dopants magnesium and/or silicon were processed at setpoint temperatures ranging from 1100° to 1400° C. with air as the oxidant starting with the aluminum alloys fully buried within a bed of particulate alumina grain filler material.

In each trial, a cylindrical alloy specimen one inch in diameter and seven-eighths inch long was cut from an ingot which had been cast from a melt prepared at 800°-900° C. The ingot was placed vertically onto a layer of 90 mesh, industrial purity, 99.5% pure aluminum oxide abrasive grain (Norton Co., 38 Alundum) contained within a suitable refractory crucible, and was subsequently covered with the same material on all sides to a thickness of roughly one quarter to one-half inch. FIG. 1A schematically shows the parent metal ingot fully embedded within the particulate filler material which, with the ingot, is contained within the refractory crucible.

For each trial, six of the assemblies using a variety of dopant concentrations were processed together in one furnace. The furnaces allowed the entry of ambient air through natural convection and diffusion through random openings in the furnace walls, as is intrinsic to conventional laboratory furnace design, as well as through a ¼ inch vent hole in the furnace door. The nominal furnace cycle allowed five hours for the furnace to reach the setpoint, eighty hours processing at the setpoint temperature, and five hours for the furnace to cool below 600° C., after which the samples were removed from the processing environment. A ceramic matrix was found to have permeated some of the alumina filler particles to produce a cohesive composite.

Figure 1B:
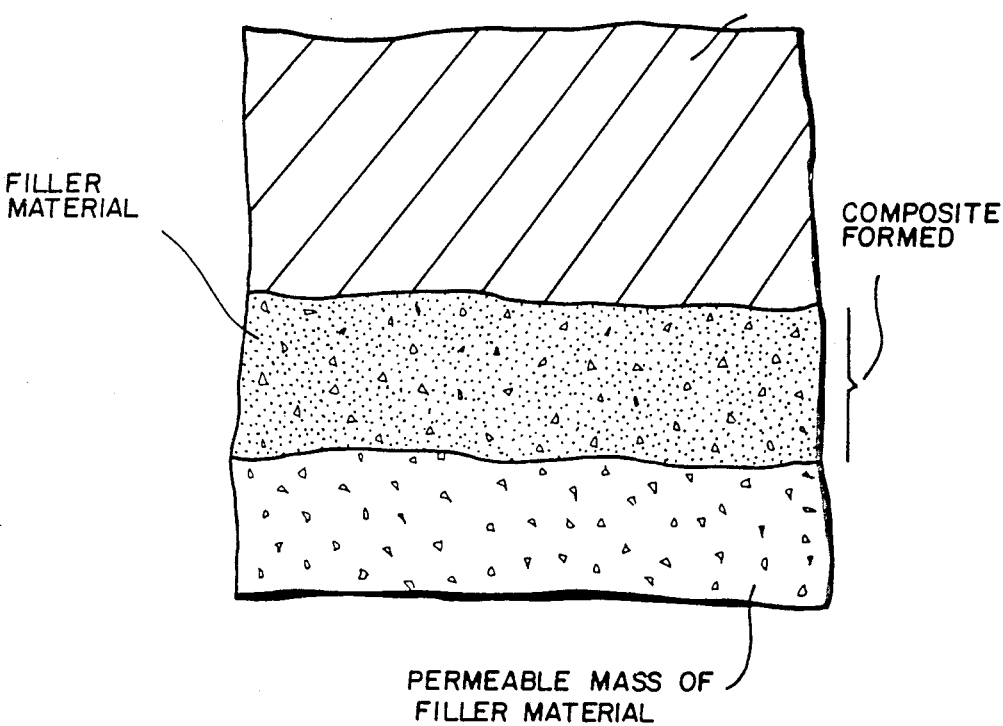
FIG. 1B is a schematic view on an enlarged scale of a portion of the assembly of FIG. 1A after permeation of a portion of the filler material by oxidation reaction product of the parent metal.
Figure 2B:
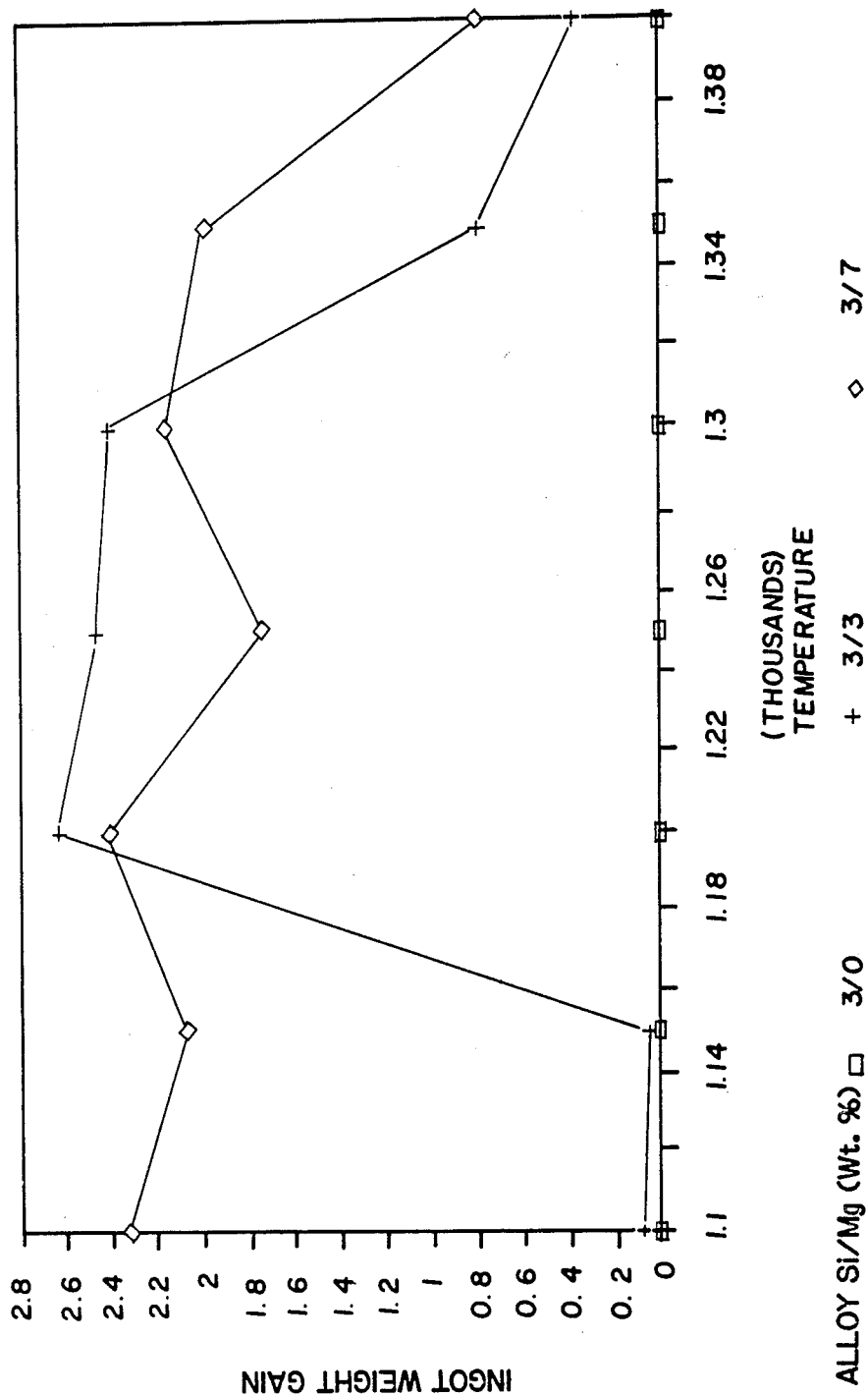
Figure 3D:
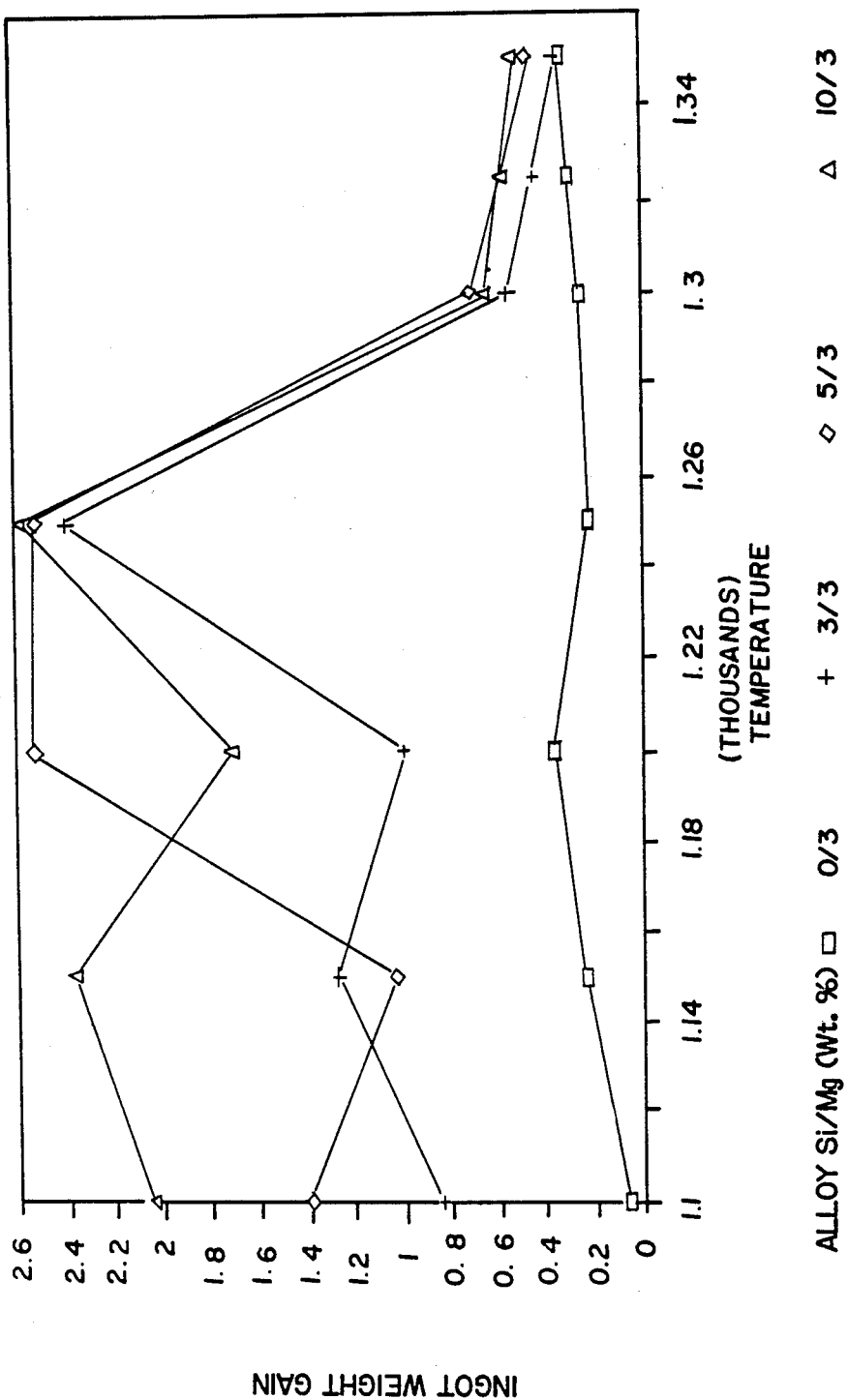
Figure 4A:
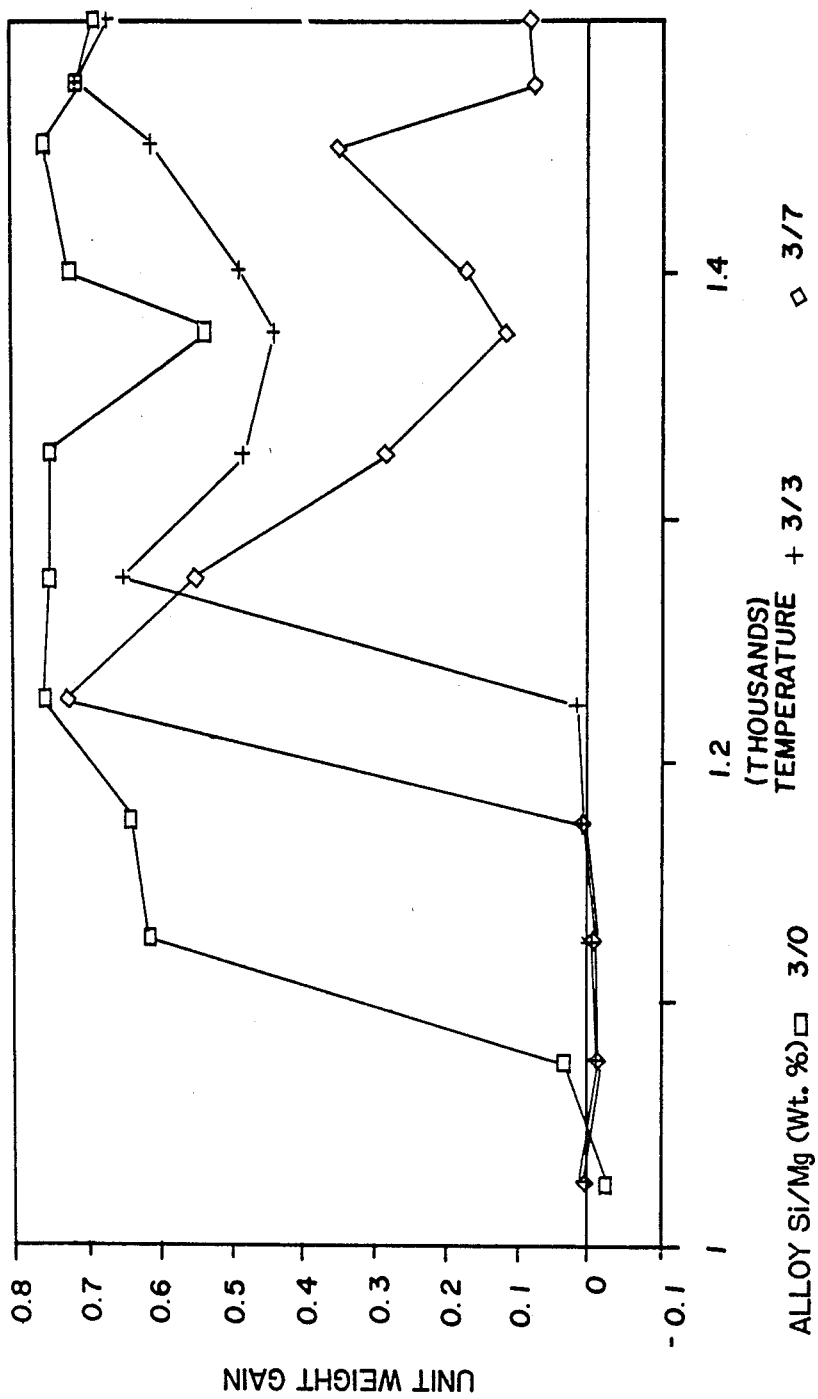

FIG. 1B shows in cross section a schematic view of what is believed to be the status of the oxidation reaction product growth region of FIG. 1A after some elapsed time under processing conditions (for example, half of the time required for completion), showing formation of the oxidation reaction product to provide the resultant polycrystalline matrix growth permeating and embedding the neighboring particulate filler as the oxidation reaction consumes molten parent metal from the available supply.

A group of four weight measurements was taken for each test, as follows: (1) the initial weight of the aluminum parent metal ingot ("Wi"); (2) the weight of the crucible and its entire load (particulate bed plus parent metal ingots) prior to processing ("Wc"); (3) the weight of the crucible and its entire load after processing ("Wc/a"); and (4) the weight of the remaining parent metal ingot and firm ceramic composite structure, including any unoxidized constituents thereof, after processing ("Wi/a"). Using these data a unit weight gain ("UWG") is calculatred as the ratio of the change in weight of the crucible plus its entire load due to the furnace cycle processing, to the original weight of the parent metal ingot. Stated otherwise, the unit weight gain (UWG) is equal to (the final weight of the assembly minus the initial weight of the assembly) divided by (the initial weight of the parent metal ingot). The foregoing relationship may also be expressed as the formula $$UWG = \frac{Wc/a - Wc}{Wi}$$

The unit weight gain can theoretically be as high as 0.89, which is equivalent to complete conversion of the aluminum to $Al_2O_3$. Shortfalls below 0.89 are attributable essentially to non-oxidized aluminum alloy parent metal or non-oxidized constituents thereof.

A second quantity derived from these data for the various samples was ingot weight gain ("IWG"), which refers to the ratio of (a) the weight of the remaining parent metal ingot and firm ceramic composite structure, including any non-oxidized constituents thereof, after processing and removal from the crucible ("Wi/a"), minus the initial weight of the parent metal ingot ("Wi"), to (b) the initial weight of the aluminum parent metal ingot ("Wi"). Stated otherwise, the ingot weight gain (IWG) equals (the final weight of the ceramic composite structure and any non-oxidized parent metal constituents, minus the initial weight of the parent metal ingot) divided by (the initial weight of parent metal ingot). The foregoing relationship may also be expressed as the formula $$IWG = \frac{Wi/a - Wi}{Wi}$$

When the ingot weight gain ("IWG") is significantly larger than the unit weight gain ("UWG"), e.g., in the range from 1 to 2.5 or greater, significant weight increase due to embedment of filler material into the predominantly ceramic polycrystalline material is demonstrated.

In the reported data, corrections were not made for items such as removal of volatiles from the refractory materials, reaction of the filler material with the oxidizing atmosphere, or other such factors. Some materials obtained in the tests were evaluated by procedures including visual inspection and cross-sectioning and mechanical measurements on selected samples to verify the nature of the composite body.

The unit weight gain and ingot weight gain at selected furnace setpoint temperatures for a series of aluminum alloys oxidized for an 80-hour heating period to grow the polycrystalline material into a bed of alumina filler material as described above with respect to FIGS. 1A and 1B are shown graphically in FIGS. 2A–2D. In this and all similar FIGURES, the x/y notation in the FIGURE key gives the nominal dopant concentration, where x is the silicon concentration and y is the magnesium concentration, both in weight percent of the total weight of parent metal. The results indicate that rapid formation of ceramic composite structures occurs primarily within the temperature range of 1100°–1400° C. for aluminum parent metal using these particular dopants and air as the oxidant. In addition, comparisons among the curves of FIGS. 2A–2D illustrate the beneficial effect of a binary doping system for aluminum-based parent metals using an oxygen-based gaseous oxidant, and demonstrate that the effective temperature range can be extended by appropriate selection of dopant material concentrations.

As further tests below will show, the ceramic composite structures resulting from the practice of the present invention show novel combinations of mechanical, electrical, thermal and other properties such as strength, hardness, toughness, and conductivity, combining the properties of the filler material and the polycrystalline matrix material. The measured properties of the ceramic composite structures were determined by the following tests. The modulus of rupture ("MOR") was determined by testing a sample rectangular strip of material measuring 0.375 inch in width ("w") and 0.125 inch in depth ("d") and over one inch in length. The test strip is positioned in a test machine with its 0.375 inch wide surfaces disposed horizontally and its 0.125 inch deep surfaces disposed vertically. The test machine imposes, by means of a ¼ inch diameter cylindrical anvil rod, an upwardly directed force n the bottom, 0.375 inch wide surface of the test strip and provides a pair of resistance points to the upwardly moving force on the top 0.375 inch wide surface of the test strip. The resistance points are one inch apart along the length of the test strip and centered on the location of the anvil rod providing the upwardly directed force. If F is the magnitude of the upwardly acting force in pounds of force, the modulus of rupture ("MOR") in pounds per square inch is calculated by the formula $$MOR = \frac{3 Fl}{2 wd^2}$$

where "w" and "d" are as above and "l" is the length in inches along the test strip between the points of resistance to the upwardly acting force. The sample test strip is ground prior to testing with a Blanchard-type grinder using a 50 grit diamond wheel and the anvil rod is applied to the test strip at a crosshead speed of 0.002 inches per minute.

The erosion rate of the ceramic composite structures produced in accordance with the invention was determined by a test using an Airbrasive jet machining unit, Model-H, made by S. S. White Industrial Products. A jet of 50-micron size alumina particles (S. S. White #3) propelled by air was impinged on a flat surface of a sample plate of the ceramic composite structure at two different test angles, one of 90° (i.e., perpendicularly to the test surface) and one of 30°, for periods of, respectively, 2 minutes at the 90° impingement angle and 4 minutes at the 30° impingement angle. The 90° and 30° tests were carried out at different locations on the sample and the depths of the two craters resulting from the tests were measured with a dial indicator depth gauge. In all tests, the following parameters were used: the distance between the sample surface (original) and the jet nozzle was 0.625 inch; the air pressure of the jet was 80 psig and the air flow rate was 0.4 standard cubic feet per minute; the nozzle bore diameter was 0.026 inch. The powder flow rate was that which, in a calibration test using the above-stated parameters, gives a crater depth of 0.056±0.004 inch on a Coors AD 998 alumina test sample at the 90° impingement angle (for 2 minutes) and a crater depth of 0.029 inch at the 30° impingement angle (for 4 minutes). Coors AD 998 alumina is a 99.8% pure aluminum oxide material.

Measurements of the corrosion rates of the ceramic composite structures of the invention were carried out by separate tests comprising immersing sample plates of the material in 10% reagent grade hydrochloric acid solution or in 10% reagent grade sulfuric acid solution at room temperature. In each case, the test samples were periodically removed from the acid solution, rinsed, dried, weighed and returned to the acid bath. The weight loss in grams per square centimeter of total exposed surface of the samples for varying times of immersion was compared to corresponding weight losses of a Coors AD 998 alumina sample.

For ceramic composite structures produced at 1250° C. from an aluminum alloy containing 10% silicon and 3% magnesium where the filler material is alumina particles as described in this Example 1, modulus of rupture values in excess of 25,000 pounds per square inch have been measured by the above-described modulus of rupture test, a macrohardness of 83 has been measured on the Rockwell A scale, erosion rates two to three times lower than that of standard 99.8% pure, dense alumina plates (Coors AD 998) have been measured by the above-described grit-blasting erosion test, and corrosion rates in 10% HCl and 10% $H_2SO_4$ which were roughly identical to that of standard (Coors AD 998) alumina plates were measured by the corrosion test described above.

EXAMPLE 2

To examine the effect of growth of the ceramic material of the present invention into a volume containing alumina particulate matter of small particle size, a sample plate of aluminum/magnesium/silicon alloy one-half inch thick by nine inches long by two inches wide and containing 10% by weight of silicon and 3% by weight of magnesium as dopants was cast from an 850° C. melt. This aluminum alloy parent metal bar was placed horizontally upon a layer of commercially pure alumina of roughly six micron particle size (Norton Co. E67 alumina, 1000 mesh) and was subsequently covered with the same material to a depth of approximately one-half inch. The alumina-covered bar was placed into an air atmosphere furnace identical to that used in Example 1 and was processed for 72 hours at a setpoint temperature of 1250° C. after allowing an initial five hours period for the furnace to reach the setpoint temperature. After the 72 hour heating period, five additional hours were allowed for the sample to cool to below 600° C., after which the sample was removed from the furnace. The unit weight gain was 0.72 and the ingot weight gain was 1.24. A sample bar ⅛ inch by ⅜ inch by 1¼ inch was cut from the resulting ceramic composite structure and measured to have a breaking strength of 30,000 pounds per square inch as measured by a modulus of rupture test and a hardness of 85.7 using the Rockwell-A scale. These data indicate a strong, hard composite material of utility as a structural ceramic, with properties in this respect superior to those of composites formed from the larger particulate filler material of Example 1.

EXAMPLE 3

To examine the effect of growth of a predominantly ceramic polycrystalline material of the present invention into a volume of filler material comprising alumina particulate material of lower purity than that of Example 1, a series of aluminum alloy parent metal ingots containing various amounts of silicon and/or magnesium dopants were embedded in a 90 mesh industrial abrasive grain material of roughly 95% alumina, 3% titania, 1% silica, and 1% of other impurities (Norton Co., El Alundum) and processed at various setpoint temperatures in the range of from 1100° to 1325° C. in a manner otherwise identical to that of Example 1. Unit weight gains and ingot weight gains for these tests are shown in FIGS. 3A–3D. At a processing temperature of 1250° C., for those parent metals containing both dopants, unit weight gains were on the order of 0.5 to 0.75, with ingot weight gains as high as 2.4 to 2.6, indicating a tolerance of the process for the various contaminants present in the filler material. The weight gain for the product obtained at or above a 1300° C. setpoint temperature was significantly lower than that obtained for a setpoint in the range 1200°–1250° C. Where ingot weight gains were large (e.g., greater than unity), the result was a composite comprised of an alpha-alumina based matrix containing particles of the abrasive grade alumina filler.

EXAMPLE 4

These tests were carried out to examine the effect of growth of predominantly ceramic polycrystalline material of the present invention into a volume of filler material comprising a particulate binary metal oxide thought to be thermodynamically stable or nearly stable under process conditions. Samples of parent metal aluminum alloys containing silicon and/or magnesium dopants alloyed therein were embedded in 325 mesh magnesium aluminate spinel and processed in a manner identical to that of Example 1, but utilizing a 94 hour heating period at various setpoints ranging from 1025° C. to 1500° C. Resulting weight gain data, indicating a range of growth temperatures at least to 1500° C., are shown in FIGS. 4A–4D. In this case the alloy containing no intentionally alloyed magnesium dopant produced significant formation of the predominantly ceramic polycrystalline matrix material of the present invention, hence indicating the efficacy of external doping with an oxide of magnesium (in this case $MgAl_2O_4$) in lieu of internal alloying of this dopant. In other words, the filler also served as a dopant. The resulting cohesive composite showed a matrix of the alpha-alumina growth together with non-oxidized constituents of the parent metal, incorporating grains of the spinel filler.

EXAMPLE 5

Additional tests were conducted to examine the effect of growth of the predominantly ceramic polycrystalline material of the present invention into a volume of filler material comprising silicon carbide which is a hard, refractory, electrically and thermally conductive matgerial not thermodynamically stable under the aluminum parent metal oxidation conditions of this invention. Selected aluminum alloys with a range of the internal dopants magnesium and/or silicon alloyed therein were embedded in particles of 90 mesh, industrial purity, 98% pure SiC abrasive grain (Norton Co. 37 Crystolon) and processed in a manner identical with that of Example 1, with the exception that a 48 hour heating period at the furnace setpoint temperature was used. The resulting unit and ingot weight gain data are shown graphically in FIGS. 5A–5D. At the highest temperatures employed, a fraction of the weight gain was due to oxidation of the SiC phase as indicated by "region 2" in the FIGURES In addition to demonstrating the preferred range of growth temperatures, the experiments also demonstrate the utility of dispersing a dopant throughout the filler material. In this case silicon dopant was obtained by chemical reduction of the silicon dioxide layer by aluminum, which layer coats the silicon carbide grains under the process conditions.

Figure 5F:
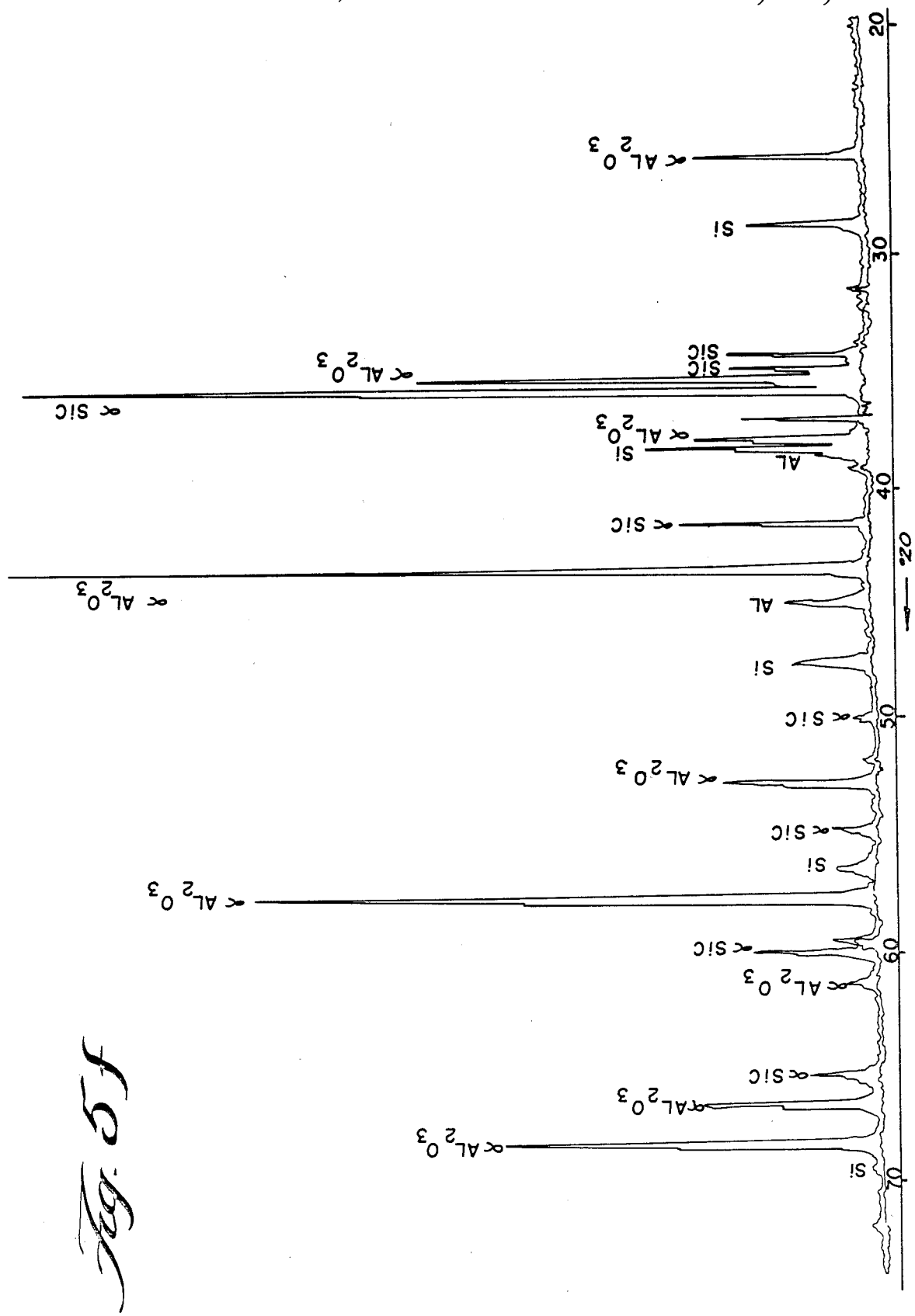
FIG. 5F is an X-ray diffraction pattern of a powdered sample of a ceramic composite structure produced in accordance with Example 5 of this specification.
Figure 6B:
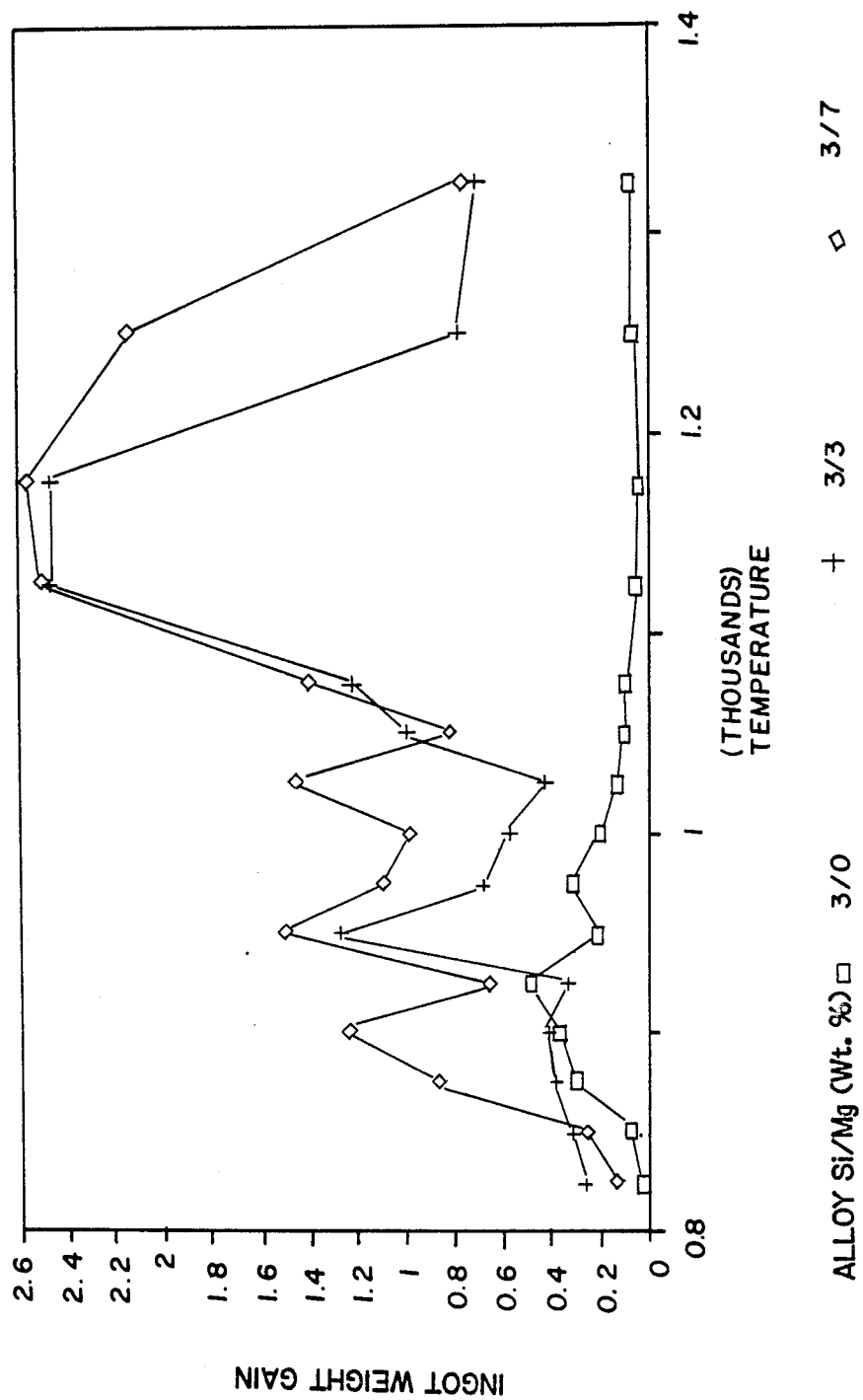
Figure 6D:
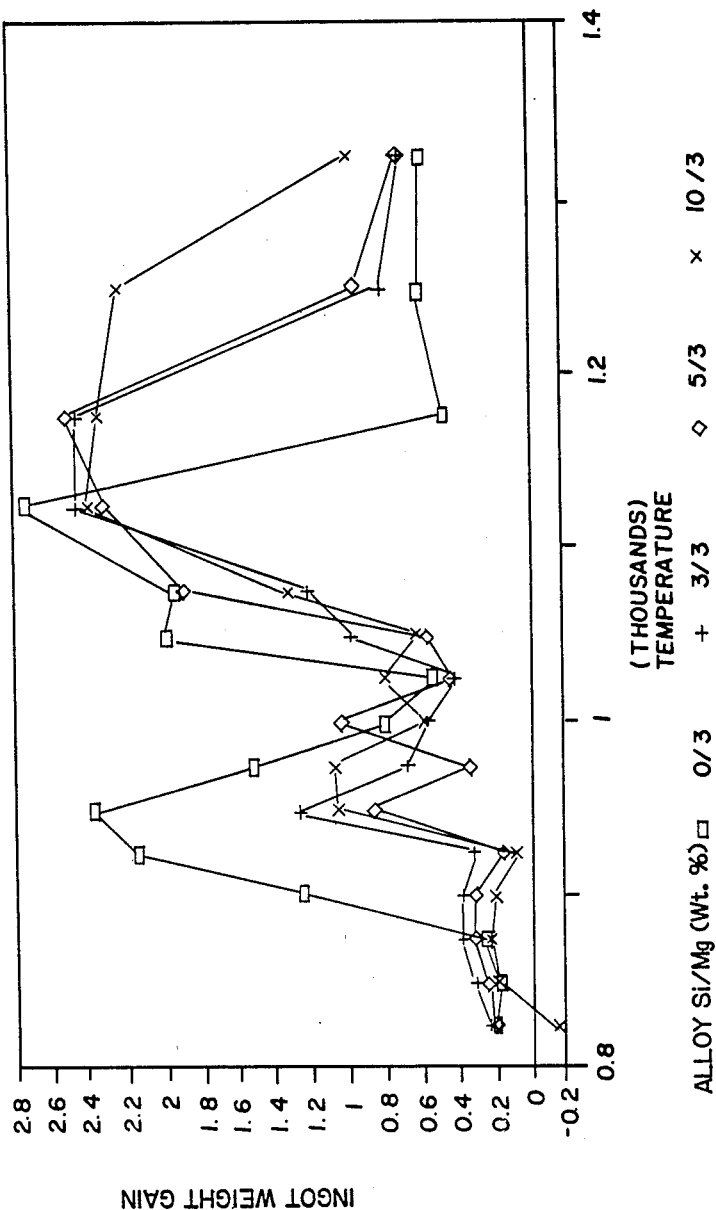

To determine the properties of a large body prepared by growing through the 98% pure SiC filler material of this example, a sample of an aluminum alloy two inches by nine inches by one-half inch in size containing 10% of silicon and 3% of magnesium dopants was prepared in the manner described in Example 2 and was embedded on five sides in 90 mesh, 95% pure aluminum oxide refractory grain (El Alundum) within a suitable refractory vessel, with an aluminum foil partition used to prevent coverage of the exposed two inch by nine inch surface. Onto this exposed surface was applied a one inch layer of 90 mesh, 98% pure SiC abrasive grain (Norton Co. 37 Crystolon). The sample was processed 60 hours at a furnace setpoint of 1300° C., after allowing a 5 hours period for the furnace to reach setpoint temperature. Following the heating period, an additional 5 hours was allowed for the sample to cool below 600° C. prior to removal from the furnace. The resulting unit weight gain was 0.61 and the ingot weight gain was 1.14. Growth was observed to occur preferentially into the silicon carbide filler material rather than into the aluminum oxide supporting bed. A photomicrograph of the resulting composite structure is shown in FIG. 5E, where the silicon carbide particles, the alumina matrix network, and the metallic constituents are indicated. X-ray diffraction data taken on a powdered portion of this sample displayed alpha-alumina, silicon carbide, aluminum and silicon phases, as indicated in FIG. 5F. This ceramic composite structure was electrically conductive, that is, it had minimal resistance as measured by a Simpson ohm meter with point probes, and demonstrated a breaking strength of 16,000 pounds per square inch using the above-described modulus of rupture test.

Additional experiments similar to those described above were performed using as the filler material 98% pure SiC grain with a smaller, 220 mesh, particle size. The material demonstrated higher strength (23,000 psi) than the material utilizing 90 mesh silicon carbide filler. Ceramic composites formed from either 90 or 220 mesh particle sizes displayed erosion resistances significantly higher than that of 99.8% pure alumina plates (Coors AD 998) as measured by the grit blasting erosion test described above. Specifically, the ceramic composite structure of this invention made with, respectively, the 90 and 220 mesh silicon carbide particles showed the following results in comparison to a standard alumina:

| Material Tested | 90° Test Crater Depth In Inches | 30° Test Crater Depth In Inches |
|---|---|---|
| 90 mesh SiC | 0.044 | 0.024 |
| 220 mesh SiC | 0.037 | 0.016 |
| Standard (Coors AD 998) | 0.056 | 0.029 |

EXAMPLE 6

To determine the effect of growth of the material of the present invention into a volume containing silicon carbide abrasive grain of a somewhat higher purity grade, experiments were performed in a manner identical to those described in Example 1, utilizing as the filler material 99+% pure SiC (Norton Co. 39 Crystolon) of 90 mesh size. Results of this series of experiments are graphically presented in FIGS. 6A-6D. This material exhibits a growth of polycrystalline matrix material at temperatures ranging as low as approximately 825° C., which is of significant value in limiting the tendency of the silicon carbide to oxidize to silica and carbon dioxide prior to formation of the silicon carbide-filled ceramic composite material of the present invention.

Tests were conducted using a filler material comprising 99+% pure SiC abrasive grain (Norton Co. 39 Crystolon) of smaller particulate sizes (220 and 500 mesh) into which the polycrystalline ceramic matrix material was grown as described above in this Example. For these tests a significant increase in modulus of rupture was measured, ranging from 12,000 pounds per square inch for 90 mesh filler material, to 37,000 pounds per square inch for 220 mesh filler material, to 59,000 pounds per square inch for the 500 mesh filler material.

Growth has also been demonstrated into filler material consisting of various mixtures of 90, 220, and 500 mesh particles of this 99+% pure SiC material, which results in a higher packing density of the filler phase than that available from a single particle size.

Growth of the ceramic composite material of the present invention has also been demonstrated from a commercial 5052 aluminum alloy containing 2.5% of magnesium dopant along with roughly 1% (combined) of other species including Fe, Cr, Si and Cu, into these silicon carbide filler materials. A ceramic composite structure was formed by oxidizing this commercial alloy in a furnace cycle of 72 hours into a filler material of 500 mesh 99+% pure SiC. The resultant material demonstrated a modulus of rupture of 54,000 to 62,000 pounds per square inch, a hardness of 84 on the Rockwell-A scale, and a fracture toughness of 7.5 Mega-Pascals-meter$^{\frac{1}{2}}$ as measured by the single-edge notched beam fracture toughness test described below. Impurities in the aluminum parent metal alloy thus did not preclude or substantially interfere with the creation of an acceptable composite ceramic structure. The toughness value obtained is unusually high as compared with traditional silicon carbide ceramic composite materials such as silicon/silicon carbide composites which usually exhibit a fracture toughness of about 3–5 Mega-Pascals-meter$^{\frac{1}{2}}$.

The fracture toughness test employed a rectangular test strip of the ceramic composite material of the invention measuring 0.118 inch to width ("w") and 0.379 inch in depth ("d") and having an isosceles triangular-shaped notch of height "a" of 0.036 inch cut in its lower surface and extending across the entire width of the test strip. The test strip was positioned with the notched, 0.118 inch-wide surface at the bottom and horizontally disposed, and with the 0.379 inch-deep surfaces being vertically disposed. A pair of ¼ inch diameter anvil rods imposed upwardly directed forces on the bottom surface of the test strip at opposite sides of the notch and equally spaced therefrom. The upwardly directed forces are imposed at locations spaced apart a distance $S_1$ along the length of the test strip. A pair of resistance points resisting the upwardly directed forces are imposed on the top surface of the test strip at opposite sides of the location of the notch and equally spaced therefrom. The resistance points are spaced apart along the length of the test strip a distance $S_2$, which is less than the distance $S_1$ between the points of upwardly applied force. Fracture toughness ("FT") is calculated by the formula $$FT = \frac{3F(S_1 - S_2)a^{\frac{1}{2}}y}{2\,wd^2}$$

where F is the upwardly acting force in pounds applied at each of the two points on the bottom surface of the test strip, a, w, d, $S_1$ and $S_2$ are as defined above, and y is a constant whose value is $$y = 1.99 - 2.47a_o + 12.97a_o^2 - 23.7a_o^3 + 24.8a_o^4$$

wherein $$a_o = \frac{a}{d}$$

For the tests conducted, $S_1$ was set at 1.5 inches, $S_2$ at 0.5 inches and the upwardly acting forces F were applied at a crosshead speed of 0.002 inches per minute. An Instron Model 1123 machine was used for both the modulus of rupture and fracture toughness tests.

An additional sample of aluminum alloy containing 10% by weight of silicon and 3% by weight of magnesium dopants alloyed into 99.7% pure aluminum was similarly processed for 95 hours at 1150° C. into filler material of 90 mesh, 99+% pure SiC. The resulting aluminum-based matrix composite with silicon carbide filler was cut into a bar 11 cm long by 1.34 cm wide by 0.45 cm thick and was self-heated by passing a current of approximately 25 Amperes at 25 Volts through the bar. The sample heated up to 1350° C. in about one minute as measured by an optical pyrometer, and was held for about 3 hours at 1350° C.±20° C. at the midpoint of the test bar with a temperature variaiton of ±20° C. from the midpoint of the bar along its entire 11 centimeter length. The resistance heating effect demonstrates electrical conductivity of the sample bar. The uniformity of temperature across the test bar showed good uniformity of composition, and thermal stability was demonstrated by the ability to maintain a constant temperature (1350° C.±20° C.) during a three hour period. Fast heat up (ambient to 1350° C. in about one minute) and fast cool down times without failure of the sample indicated good thermal shock resistance.

EXAMPLE 7

A sample of commercially pure 1100 aluminum alloy plate measuring two inches by nine inches by one-half inch was coated with a 4 gram casein slip containing magnesium oxide to provide the magnesium dopant for the aluminum parent metal. The plate was embedded in 90 mesh silicon carbide of 98% purity (Norton Co. 37 Crystolon) from which silicon dopant could be obtained by chemical reduction of the silicon dioxide layer covering the silicon carbide particles. The sample was processed with a furnace cycle of 72 hours at a setpoint of 1200° C., plus an initial 5 hours for the furnace to reach setpoint temperature and 5 hours after the heating period for the sample to cool to 600° C. for removal from the furnace. The sample showed 0.88 unit weight gain (uncorrected for oxidation of the silicon carbide material) and 1.48 ingot weight gain, thus demonstrating the formation of an alumina-based matrix ceramic composite structure of the present invention from a commercially pure 1100 aluminum alloy through the use of external doping of the parent metal.

EXAMPLE 8

To determine the effect of growth of an alumina-based ceramic matrix material of the present invention into a volume containing a metallic filler material, a coil roughly one inch tall, one and one quarter inch in diameter, and containing roughly five turns of a commercial wire alloy containing 75% iron, 20% chromium, and 5% aluminum (Kanthal Co. A-1 alloy wire) was prepared. This wire coil was oxidized for 24 hours at 1200° C. in an oxygen atmosphere to form thereon a protective surface layer of aluminum oxide. In the manner described in Example 1, an aluminum alloy ingot one inch in diameter and seven-eighths inch long and containing 7% of silicon and 3% of magnesium dopants was prepared and embedded in 90 mesh;, 99+% pure alumina grain (Norton Company, 38 Alundum), with the oxidized wire coil placed concentric with the parent metal ingot and separated roughly one-eighth of an inch therefrom. This assembly was processed for 96 hours at a setpoint temperature of 1200° C., after an initial six hours for the furnace to reach setpoint temperature. After allowing ten hours for the sample to cool, it was removed from the furnace. Unit weight gain was 0.74 and ingot weight gain was 2.56. Examination of a cross section of the sample revealed a cohesive composite having a ductile wire phase together with the 99+% alpha-alumina particulate material captured within an alpha-alumina based ceramic matrix of the present invention. FIGS. 7A and 7B show photomicrographs at 50× and at 200× magnification, respectively, of the microstructures showing entrapped wire and alumina particles embedded within the polycrystalline matrix of the present invention. This demonstrates the compatibility of the process and of the material of this invention with reactive filler materials in solid form when provided with an inert protective layer to separate an otherwise unstable material or phase from the process environment.

EXAMPLE 9

Figure 8:
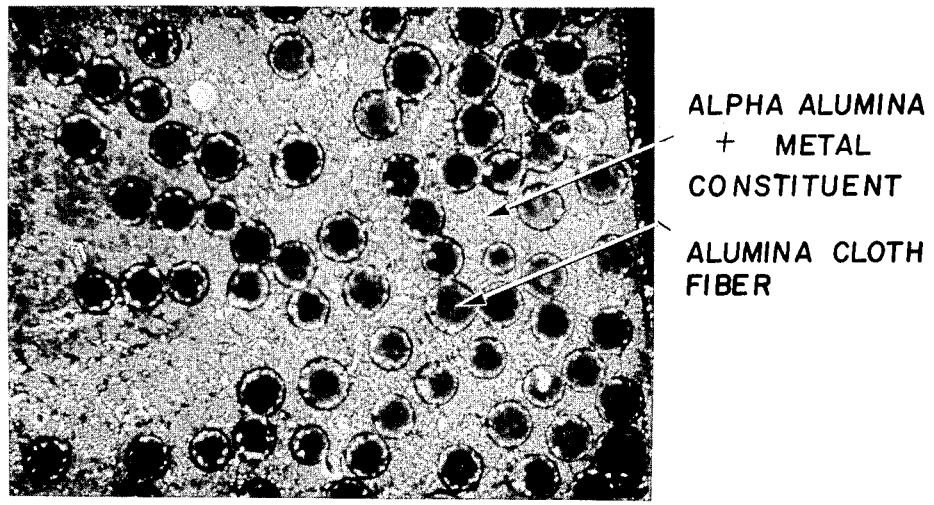
FIG. 8 is a photomicrograph at 400× magnification of a cross section of a ceramic composite structure in accordance with the present invention containing layers of an alumina cloth filler material.

To determine the effect of growth of a material of the present invention into a two-dimensional woven cloth of a suitable filler material to yield a composite of the present invention, experiments were conducted with woven alumina ceramic fiber cloth (DuPont Co. FP alumina). The parent metal employed for this Example consisted of a commercial aluminum alloy, (Number 5052) containing 2.5% of magnesium along with roughly 1% (combined total) of other species such as Fe, Cr, Si, and Cu. Two samples each measuring two inches by nine inches by one-half inch, were prepared and were placed on top of one another to form a two inch by nine inch by one inch parent metal bar. The top surface of the bar was covered with a layer containing 2-5 grams of silicon dioxide dopant mixed with a binder of polyvinyl alcohol and water. The bar was placed horizontally upon a layer of 95% pure alumina refractory grain (El Alundum) of 90 mesh size, and was covered on four sides leaving the top, coated surface exposed. Upon this surface were placed six layers of the alumina cloth, each measuring roughly three inches by ten inches, and these were held loosely in place by refractory brick fragments located around the edges of the cloth. The assembly was placed into a furnace identical to that described in Example 1 and was heated in air to 1125° C. for a period of 180 hours. FIG. 8 is a photograph of a cross section of the resulting ceramic fiber-containing composite, showing the cloth filler material entrapped within a ceramic matrix consisting in part of an interconnected alpha-alumina matrix and non-oxidized metal. Similar cloth-containing composites have been produced with other materials, including zirconia cloth and a silicon carbide-based cloth. If the ceramic fiber-to-matrix interface bond is not too strong and the parent metal and oxidant do not attack the fibers, such composites can potentially have the utility of very high strength in two dimensions imparted by the cloth and/or an increase in toughness of the composite material imparted by crack deflection and fiber pull-out fracture mechanisms.

EXAMPLE 10

In order to demonstrate growth of a ceramic composite of the present invention in an atmosphere less oxidizing than air, experiments were conducted in an inert gas which had been passed through a bath of heated water. In one example, an aluminum parent metal containing 10% by weight silicon and 3% by weight magnesium was prepared as a bar three inches long by one-quarter inch thick by three-eighths inch wide and was surrounded by 500 mesh SiC of 99% purity (Norton 39 Crystolon) in a refractory boat. This was placed in a furnace preheated to 1200° C., allowing fifteen minutes for insertion into the heated zone. Over this sample was passed argon of 99.998% purity which had been passed through a bath of distilled water heated to 50° C. In this case, moisture served as the oxidant. The sample was removed from the furnace after approximately 20 hours and a unit weight gain of 19% was measured, producing an alpha-alumina based ceramic matrix composite containing silicon carbide particles. This indicates that the formation of the ceramic material of the present invention can be performed in oxidizing environments having lower oxygen activity than air.

EXAMPLE 11

To demonstrate the growth of a ceramic composite material with an aluminum nitride-based matrix, an ingot was prepared of 380.1 aluminum (alloy from Belmont Metals Inc.) measuring 2 inches by 1 inch by ¼ inch. This ingot was coated with a layer (approximately ⅛ inch thick) of AlN particles having an organic binder on all surfaces except for one of the surfaces measuring 1 by 2 inch face. This alloy had a nominally identified composition by weight of 8–8.5 percent Si, 2–3 percent Zn and 0.1 percent Mg as active dopants, and 3.5 percent copper as well as iron, manganese and nickel, but the magnesium content was sometimes higher as in the range of 0.17–0.18 percent. The coated ingot was then placed in a bed of 24 mesh size alpha-alumina, in a refractory crucible, such that the uncoated face of the ingot was substantially flush with the bedding. The above system was heated in a resistance furnace at a setpoint temperature of 1250° C. in an atmosphere of forming gas (96% nitrogen and 4% hydrogen) for 24 hours.

An aluminum nitride-based matrix grew through the thin layer of AlN particles into the volume containing the alumina bedding and produced a cohesive aluminum nitride/alumina composite material. The presence of both the aluminum nitride matrix and the alumina filler in the resulting composite was confirmed by X-ray powder diffraction.

The unit weight gain for the above sample was 0.41. The theoretical unit weight gain for complete conversion of aluminum to aluminum nitride is 0.52. Thus, good conversion of aluminum to aluminum nitride and good composite growth were obtained in this experiment.

EXAMPLE 12

Two separate filler materials were prepared, each containing an admixture of aluminum nitride and alumina powders in ratios of 20:80 and 50:50 weight pecents. The mesh size of the two filler materials was −325 and 220 for aluminum nitride and alumina, respectively. An ingot of commercially available 380.1 aluminum alloy and measuring ¾ inch by ½ inch by ½ inch was embedded in each of the filler materials. Each lay-up was heated separately in an induction furnace at a 1300° C. setpoint temperature for 36 hours in an atmosphere of forming gas (96% nitrogen and 4% hydrogen) flowed through the furnace at a rate of 100 cc/min.

Each of the above-described systems exhibited growth of aluminum nitride into the bedding material, forming a cohesive composite of aluminum nitride and aluminum oxide particles in a matrix of aluminum nitride plus some unreacted constituents of the parent metal. The presence of aluminum nitride and alumina in the resulting composite material was confirmed by X-ray powder diffraction. The unit weight gains for the above samples are listed in TABLE 12 below.

TABLE 12

| Weight Gains For AlN/Matrix Composites | |
| --- | --- |
| Filler Material | Unit Weight Gain |
| 20/80 (AlN/Al$_2$O$_3$) | .385 |
| 50/50 (AlN/Al$_2$O$_3$) | .437 |

This example further illustrates the growth of a composite with an AlN-based matrix, and also shows that a composite having a heterogeneous filler can be formed by the process of this invention.

EXAMPLE 13

To show the growth of zirconium nitride into a volume containing a filler material thereby yielding a composite of the filler with a zirconium nitride matrix, a cylindrical rod of zirconium, ¾ inch in height and ½ inch in diameter, was embedded within a bed of zirconium diboride powder (−100+325 mesh size). The system was heated in an induction furnace by direct coupling to the zirconium for 15 minutes at a setpoint temperature slightly in excess of 2000° C. in forming gas (same composition as in Example 11) flowing at a rate of 400 cc/min.

The result was growth of a zirconium nitride matrix into the volume containing the zirconium diboride filler material thereby producing a cohesive zirconium nitride/zirconium diboride composite material. X-ray powder diffraction confirmed the presence of zirconium nitride and zirconium diboride in the resulting composite material.

The foregoing procedure was repeated except that the zirconium nitride was grown into a volume containing zirconium nitride powder (1–5 μm particle size), and the forming gas oxidizing atmosphere flow rate was 200 cc/min. Growth of a zirconium nitride matrix into the zirconium nitride filler material resulted, thereby producing a cohesive zirconium nitride/zirconium nitride composite material. X-ray powder diffraction confirmed the zirconium nitride composition of the end product.

EXAMPLE 14

To show the growth of titanium nitride into a volume containing a filler material yielding a composite of the filler with a titanium nitride matrix, a cylindrical ingot of titanium ¾ inch in height and ½ inch in diameter was placed in a bed of alumina (38 Alundum, 90 mesh). The above system was heated in an induction heating furnace by direct coupling to the titanium for 2.5 hours at a setpoint temperature of approximately 2000° C. in forming gas (same composition as in Example 11) flowing at a rate of 400 cc/min.

The above system exhibited growth of titanium nitride into the alumina-containing volume producing a cohesive titanium nitride/alumina composite material. Analysis of the above-formed composite material by X-ray powder diffraction confirmed the presence of titanium nitride, alumina and trace amounts of titanium metal.

The foregoing procedure was repeated except that titanium nitride powder was employed as the filler material. The reaction was carried out for 20 minutes at a setpoint temperature slightly in excess of 2000° C.

The above-described procedure produced a cohesive titanium nitride/titanium nitride composite material. X-ray powder diffraction analysis confirmed the titanium nitride composition of the composite.

The foregoing procedure was repeated again except that titanium diboride powder was instead employed as the filler material and pure nitrogen was employed as the oxidizing atmosphere. The reaction was carried out for 10 minutes and the nitrogen flow rate was 600 cc/min.

X-ray powder diffraction analysis confirmed that the cohesive composite which resulted was comprised of titanium nitride and titanium diboride.

EXAMPLE 15

To demonstrate the growth of an alpha-alumina ceramic matrix into a fine silicon carbide filler using a parent aluminum alloy different from the Al/Mg/Si alloys of Example 6, a nine inch by two inch by one-half inch sheet of commercially available 380.1 aluminum alloy was embedded within a bed of silicon carbide (Norton 39 Crystolon of 500 mesh particle size). The system was heated in a resistance furnace to a 1000° C. setpoint temperature for 75 hours in air.

In this system, growth of alpha-alumina into the silicon carbide resulted in the formation of cohesive composite material comprising silicon carbide particles in a matrix containing aluminum oxide plus minor amounts of unreacted constituents of the parent alloy.

X-ray powder diffraction analysis of the resulting composite confirmed the presence of alpha-alumina and silicon carbide. The unit weight gain for the above-described system was 0.478 indicating substantial oxidation of the aluminum precursor into the silicon carbide filler.

EXAMPLE 16

To demonstrate the use of composite filler materials containing zirconium oxide, alpha-alumina was grown by the method of this invention into a volume of commercially available Norton ZF Alundum (an abrasive grain material containing alumina and zirconia). In this demonstration, a 1 inch long by ⅜ inch diameter cylindrical ingot of commercially available 380.1 aluminum was embedded within a bed of the above-described alumina-zirconia material. The system was heated in a resistance furnace to a 1000° C. reaction setpoint temperature for 95 hours in air.

Growth of the alpha-alumina oxidation reaction product into the alumina-zirconia volume resulted in the formation of a cohesive alpha-alumina/zirconia composite material where the ZF material was captured in an alpha-alumina matrix grown by the process of the present invention.

X-ray powder diffraction analysis of the resulting composite material confirmed the presence of alpha-alumina and zirconia. The weight gain ratio for the above-described system was 0.32 indicating substantial oxidation of the aluminum precursor into the zirconia/alumina filler.

The foregoing procedure was repeated except that the filler material above was replaced by zirconia powder (Muscle Shoals, stabilized by calcium oxide, −30 mesh). Substantial oxidation of the aluminum ingot into the zirconia-containing volume occurred, yielding a cohesive alpha-alumina/zirconia composite material, as confirmed by X-ray powder diffraction.

EXAMPLE 17

To show the growth of a tin oxide matrix into a volume containing alumina particles (−75+100 mesh) thereby resulting in a tin dioxide/alumina composite material, a cylindrical ingot 2 cm tall and 3 cm in diameter was embedded within a bed of the alumina. The system was heated to a setpoint temperature of 1100° C. in air for 48 hours.

The tin oxidized and grew a ceramic matrix into the alumina filler resulting in a cohesive tin dioxide/alumina composite material. X-ray powder diffraction analysis confirmed the presence of tin dioxide and alpha-alumina in the resulting material.

The unit weight gain for the above system was 0.28, as compared to the theoretical weight gain for tin dioxide of 0.27; hence oxidation of the tin precursor into the alpha-alumina bed was substantially complete.

EXAMPLE 18

To demonstrate the growth of an alpha-alumina matrix into filler material of alumina "bubbles", i.e., hollow alumina bodies, (Norton, E163 Alundum 4 to 28 mesh size) at various process temperatures, cylindrical ingots one inch long by ⅞ inch diameter of several aluminum alloys, in some cases externally doped, were embedded separately in beds of the above-described filler material. The alloys were processed in air at setpoint temperatrues ranging from 950°–1250° C. and for two separate process times, 48 and 80 hours. The unit weight gains for the above-described systems, at each process time, are listed in TABLES 18(a) and 18(b) below.

TABLE 18(a)

| | Unit Weight Gains 48 Hours | | | | |
| | | Process Temperature (°C.) | | | |
| Al Alloy | External Dopant | 950 | 1050 | 1150 | 1250 |
| 2.5% Mg | 140 grit SiO$_2$ | .01 | — | .58 | .28 |
| 6% Zn + 10% Si | none | .63 | .67 | .70 | .65 |
| 3% Zn + 7% Mg | none | .04 | .12 | .72 | .74 |
| 6% Zn | MgO powder | .73 | .70 | .71 | .71 |

TABLE 18(b)

| Al Alloy | External Dopant | Unit Weight Gains 80 Hours Process Temperature (°C.) | | | |
|---|---|---|---|---|---|
| | | 950 | 1050 | 1150 | 1250 |
| 2.5% Mg | 140 grit SiO₂ | −.02 | .52 | .66 | .58 |
| 6% ZN + 10% Si | none | .63 | .67 | .68 | .63 |
| 3% Zn + 7% Mg | none | .04 | .26 | .74 | .72 |
| 6% Zn | MgO powder | .60 | .72 | .68 | .71 |
| 10% Si + 3% Mg | none | .07 | .71 | .71 | .75 |
| 380.1 | none | .65 | .69 | .69 | .13 |

The data in TABLES 18(a) and 18(b) and examination of the samples confirm the formation of composites by the process of this invention, each composite having an alpha-alumina matrix and alumina bubble filler material.

EXAMPLE 19

To demonstrate the formation of a composite material having a silicon nitride matrix, 10.70g of 98.4% pure silicon chips were submerged in a bed containing 90 weight percent titanium nitride powder (−325 mesh) and 10 weight percent titanium metal (titanium metal added to enhance wetting by molten silicon), and the system was heated to a reaction temperature of 1500° C. for 30 minutes in an atmosphere of forming gas flowing at 600 cc/min.

X-ray powder diffraction analysis and examination of the sample produced by the above-described procedure confirmed the presence of the titanium nitride filler, the formation of silicon nitride and also the conversion of the titanium metal in the bedding to titanium nitride. Ceramographic and energy dispersion X-ray analysis of the sample indicated the formation of a cohesive composite material having a silicon nitride matrix.

EXAMPLE 20

To demonstrate the growth of a composite material having an alpha-alumina matrix incorporating silicon carbide ceramic fibers, two bars of commercially available 380.1 aluminum, 9 inches by 2 inches by ½ inch each were stacked one on top of the other and placed in a refractory bedding of alumina particles (El Alundum, 90 mesh size) such that the 9 by 2 inch face of the top bar was exposed and substantially flush with the alumina bedding. A thin layer of silicon carbide particles (Norton 39 Crystalon, 220 mesh size) was applied to the exposed aluminum surface and on top of that layer was placed 5 layers of Nicalon silicon carbide cloth (made by Nippon Carbon Co.) each separated by a thin layer of the above-described silicon carbide particles. The described system was heated to a setpoint temperature of 1000° for 75 hours in air.

Figure 9:
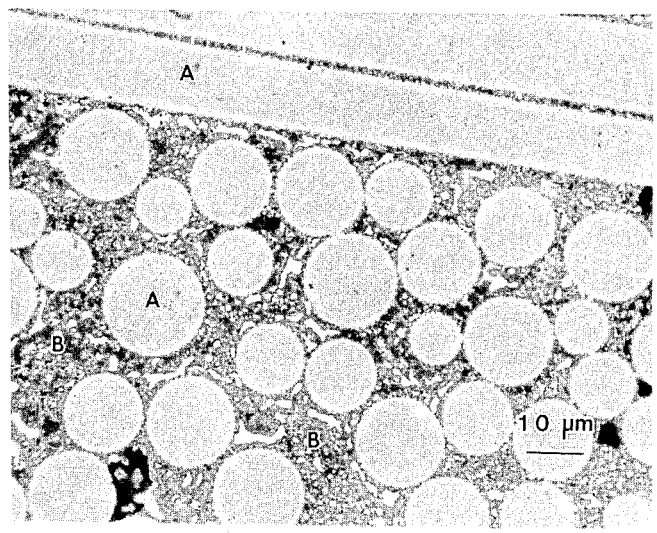
FIG. 9 is a photomicrograph at 1000× of ceramic composite having an alpha-alumina matrix embedding silicon carbide particles and silicon carbide ceramic fibers prepared in accordance with Example 20.

The above procedure produced a cohesive composite material having an alpha-alumina matrix embedding alternately the layers of silicon carbide particles and the layers of silicon carbide cloth without disturbing the cloth weave and the lay-up configuration. FIG. 9 is a photomicrograph of the composite material produced in the above example.

EXAMPLE 21

To demonstrate the growth of a composite material having an alpha-alumina matrix embedding a filler material comprised of barium titanate particles, a cylindrical ingot of commercially available 712 aluminum, alloyed with an additional 10% silicon, 1 inch tall by ⅞ inch diameter was submerged into a bedding of $BaTiO_3$ particles in a refractory crucible. The ingot, bedding and crucible were placed in a resistance furnace and heated to a 1100° C. setpoint temperature for 95 hours in air.

The unit weight gain for the above-described system was 0.71, evidencing substantial conversion of the aluminum ingot to the alpha-alumina ceramic matrix. X-ray powder diffraction analysis of the resulting composite material illustrated the presence of the alpha-alumina matrix, $BaTiO_3$, silicon, and various oxidized and unoxidized constituents deriving from the 712 alloy.

The above example demonstrated the incorporation of a barium titanate filler material into an alpha-alumina matrix, thereby producing a cohesive composite.

Although only a few exemplary embodiments of this invention have been described in detail above, those skilled in the art will readily appreciate that the present invention embraces many variations other than those exemplified.

What is claimed is:

1. A method for producing a self-supporting ceramic composite structure comprising (1) a ceramic matrix obtained by oxidation of a parent metal to form a polycrystalline material comprising an oxidation reaction product of said parent metal with a vapor-phase oxidant; and, (2) at least one filler embedded by said matrix, the method comprising the steps of:

(a) positioning said parent metal adjacent to a permeable mass of filler and orienting said parent metal and said filler relative to each other so that formation of said oxidation reaction product will occur in a direction towards and into said mass of filler;

(b) heating said parent metal to a temperature above its melting point but below the melting point of its oxidation reaction to form a body of molten parent metal and reacting the molten parent metal with said oxidant at said temperature to form said oxidation reaction product, and at said temperature maintaining at least a portion of said oxidation reaction product in contact with and extending between said body of molten metal and said oxidant, to draw molten metal through the oxidation reaction product towards the oxidant and towards and into the adjacent mass of filler so that fresh oxidation reaction product continues to form within the mass of filler at an interface between the oxidant and previously formed oxidation reaction product; and (c) continuing said reacting for a time sufficient to embed at least a portion of the filler within said polycrystalline material.

2. The method of claim 1, wherein said parent metal comprises a material selected from the group consisting of titanium, zirconium, silicon and tin.

3. The method of claim 1, wherein said parent metal comprises aluminum.

4. The method of claims 1, 2 or 3, wherein said parent metal is provided with at least one dopant.

5. The method of claim 4, wherein said dopant comprises a material selected from the group consisting of at least one of magnesium, zinc, silicon, germanium, tin, lead, boron, sodium, lithium, calcium, phosphorus, yttrium and rare earth metals.

6. The method of claims 1, 2 or 3, wherein said parent metal is provided with at least two dopants.

7. The method of claim 6, wherein said dopants comprise a source of at least one of magnesium and zinc, plus a source of at least one of silicon, lead, tin, germanium, sodium, lithium, calcium, boron, phosphorus, yttrium and rare earth metals.

8. The method of claim 7, wherein said parent metal comprises aluminum and said dopants comprise a source of magnesium and a source of silicon.

9. The method of claim 4, wherein at least one dopant is alloyed into the parent metal.

10. The method of claim 4, wherein at least one dopant is applied as a layer of dopant onto a surface of said parent metal, and including forming the oxidation reaction product through and beyond the depth of the applied layer of dopant.

11. The method of claim 4, wherein at least a portion of said filler comprises at least one dopant.

12. The method of claim 11, wherein at least one second dopant is alloyed with said parent metal or applied to the surface of said parent metal, or both.

13. The method of claim 11, wherein said parent metal comprises aluminum.

14. The method of claim 12, wherein said dopant comprises a source of at least one of magnesium and zinc, plus a source of at least one element selected from the group consisting of silicon, lead, tin, germanium, sodium, lithium, calcium, boron, phosphorus, yttrium and the rare earth metals.

15. The method of claim 1, wherein said oxidant comprises at least one material selected from the group consisting of an oxygen-containing gas, nitrogen-containing gas, a halogen, sulphur, phosphorus, arsenic, carbon, boron, selenium, tellurium, an $H_2/H_2O$ mixture, methane, ethane, propane, acetylene, ethylene, propylene, and a $CO/CO_2$ mixture.

16. The method of claim 4, wherein said oxidant comprises at least one material selected from the group consisting of an oxygen-containing gas, nitrogen-containing gas, a halogen, sulphur, phosphorus, arsenic, carbon, boron, selenium, tellurium, an $H_2/H_2O$ mixture, methane, ethane, propane, acetylene, ethylene, propylene, and a $CO/CO_2$ mixture.

17. The method of claim 12, wherein said oxidant comprises air at atmospheric pressure.

18. The method of claim 4, wherein said parent metal comprises aluminum, said vapor-phase oxidant comprises air, said oxidation reaction product comprises alpha-alumina and said dopant comprises at least one element selected from the group consisting of magnesium, zinc, silicon, lead, tin, germanium, sodium, lithium, calcium, boron, phosphorus, yttrium and the rare earth metals.

19. The method of claims 1 or 5, wherein said parent metal comprises aluminum, said vapor-phase oxidant comprises a nitrogen-containing gas and said oxidation reaction product comprises aluminum nitride.

20. The method of claim 1, wherein said parent metal comprises zirconium, said vapor-phase oxidant comprises a nitrogen-containing gas and said oxidation reaction product comprises zirconium nitride.

21. The method of claim 1, wherein said parent metal comprises titanium, said oxidant comprises an nitrogen containing gas and said oxidation reaction product comprises titanium nitride.

22. The method of claim 1, wherein said parent metal comprises tin, said oxidant comprises an oxygen-containing gas and said oxidation reaction product comprises an oxide of tin.

23. The method of claim 1, wherein said oxidation reaction product comprises a material selected from the group consisting of an oxide, nitride, carbide, boride, and oxynitride.

24. The method of claim 3, wherein said temperature is from about 850° C. to about 1450° C. and said parent metal is provided with at least one dopant.

25. The method of claim 24, wherein said vapor-phase oxidant comprises air and said oxidation reaction product comprises alpha-alumina.

26. The method of claim 1, claim 2 or claim 3, wherein said filler is substantially thermodynamically stable with respect to said oxidant during said oxidation of said parent metal.

27. The method of claim 1, claim 2 or claim 3, wherein said filler comprises at least one single metal oxide of a metal selected from the group consisting of aluminum, cerium, hafnium, lanthanum, neodymium, praseodymium, samarium, scandium, thorium, uranium, yttrium, and zirconium.

28. The method of claim 1, claim 2 or claim 3, wherein said filler comprises a binary, ternary, or higher order metal oxide.

29. The method of claim 28, wherein said metal oxide comprises the binary oxide magnesium aluminate spinel.

30. The method of claim 1 or claim 3, wherein said filler comprises at least one of carbon fibers and carbon particles.

31. The method of claim 1, wherein said parent metal comprises aluminum, said vapor-phase oxidant comprises an oxygen-containing gas, and said oxidation reaction product comprises aluminum oxide.

32. The method of claim 1, wherein said parent metal comprises silicon, said vapor-phase oxidant comprises a carbon gas, and said oxidation reaction product comprises silicon carbide.

33. The method of claim 1, wherein said parent metal comprises silicon, said vapor-phase oxidant comprises a nitrogen-containing gas, and said oxidation reaction product comprises silicon nitride.

34. The method of claim 1, claim 2 or claim 3, wherein said filler comprises at least one material selected from the group consisting of aluminum oxide, silicon carbide, silicon aluminum oxynitride, zirconium oxide, zirconium boride, titanium nitride, barium titanate, boron nitride, silicon nitride, iron-chromium-alumium alloy, and aluminum.

35. The method of claim 34, wherein said parent metal is provided with at least one dopant.

36. The method of claims 1, 2, 3, 20, 21, 22, 23, 24 or 25, wherein said filler comprises at least one material selected from the group consisting of hollow bodies, particulates, fibers, whiskers, spheres, plates, aggregate, rods, bars, and platelets.

37. The method of claim 3, wherein the filler comprises silicon carbide and said temperature is from about 850° C. to about 1450° C.

38. The method of claim 34, wherein said filler comprises at least one of refractory fiber cloth and carbon fiber.

39. The method of claim 4, wherein said parent metal comprises aluminum and said polycrystalline material comprises an initiation surface of a spinel formed as an oxidation reaction product of said parent metal, said dopant and said oxidant.

40. The method of claim 6, wherein said parent metal comprises aluminum, said vapor-phase oxidant comprises a nitrogen-containing gas and said oxidation reaction product comprises aluminum nitride.

41. The method of claim 19, wherein said filler comprises at least one material selected from the group consisting of hollow bodies, particulates, fibers, whiskers, spheres, plates, aggregate, rods, bars, and platelets.

42. The method of claim 40, wherein said filler comprises at least one material selected from the group consisting of hollow bodies, particulates, fibers, whiskers, spheres, plates, aggregate, rods, bars, platelets.

43. The method of claim 6, wherein the filler comprises silicon carbide and said temperature is from about 850° C. to about 1450° C.

44. The method of claim 13, wherein said dopant comprises a source of at least one of magnesium and zinc, plus a source of at least one element selected from the group consisting of silicon, lead, tin, germanium, sodium, lithium, calcium, boron, phosphorus, yttrium and the rare earth metals.

45. The method of claim 13, wherein said oxidant comprises air at atmospheric pressure.

46. The method of claim 18, wherein said filler comprises at least one material selected from the group consisting of hollow bodies, particulates, fibers, whiskers, spheres, plates, aggregate, rods, bars, and platelets.

47. The method of claim 5, wherein said oxidant comprises at least one material selected from the group consisting of an oxygen-containing gas, nitrogen-containing gas, a halogen, sulphur, phosphorus, arsenic, carbon, boron, selenium, tellurium, a $H_2/H_2O$ mixture, methane, ethane, propane, acetylene, ethylene, propylene, and a $CO/CO_2$ mixture.

48. The method of claim 5, wherein said parent metal comprises aluminum, said vapor-phase oxidant comprises a nitrogen-containing gas and said oxidation reaction product comprises aluminum nitride.

* * * * *

UNITED STATES PATENT AND TRADEMARK OFFICE
CERTIFICATE OF CORRECTION

PATENT NO. : 4,851,375

DATED : July 25, 1989

INVENTOR(S) : Marc S. Newkirk et al.

It is certified that error appears in the above-identified patent and that said Letters Patent is hereby corrected as shown below:

On the cover page under item [75]: after "Harry R. Zwicker," change "Elkton, Md." to --Glen Mills, PA--

On the cover page under item [56]: change "Suefert" to --Seufert-- (two occurrences)

Column 1, line 9: change "name" to --names--;
         line 10: after "et al" insert a period.
Column 2, line 1: change "overcmoe" to --overcome--.
Column 3, line 4: change "name" to --names--;
         line 11: change "name" to --names--; after "et al" insert a period.
Column 6, line 3: change "mroe" to --more--.
Column 7, line 3: change "showin" to --showing--;
         line 66: change "steelwool" to --steel wool--.
Column 8, line 61: change "substnatially" to --substantially--.
Column 9, line 52: change "from" to --form--.
Column 11, line 61: change "applieed" to --applied--.

UNITED STATES PATENT AND TRADEMARK OFFICE
CERTIFICATE OF CORRECTION

PATENT NO. : 4,851,375

DATED : July 25, 1989

INVENTOR(S) : Marc S. Newkirk et al

It is certified that error appears in the above-identified patent and that said Letters Patent is hereby corrected as shown below:

```
Column 12, line 1:      change "accompished" to --accomplished--;
           line 10:     change "sourvce" to --source--.
Column 15, line 3:      change "cross-sectio" to --cross-section--.
Column 16, line 8:      change "inventnion" to --invention--;
           line 63:     change "calculatred" to --calculated--.
Column 18, line 13:     change "n" to --on--.
Column 20, line 47:     change "matgerial" to --material--;
           line 60:     after "FIGURES" insert a period.
Column 23, line 33:     change "unifromity" to --uniformity--.
Column 28, line 53:     change "trues" to --tures--.
Column 29, line 50:     change "Crystalon" to --Crystolon--.
Column 31, line 64:     change "an" to --a--.
```

Signed and Sealed this

Ninth Day of March, 1993

Attest:

STEPHEN G. KUNIN

*Attesting Officer*    Acting Commissioner of Patents and Trademarks